United States Patent
Krishna et al.

(10) Patent No.: US 10,437,592 B2
(45) Date of Patent: Oct. 8, 2019

(54) REDUCED LOGIC LEVEL OPERATION FOLDING OF CONTEXT HISTORY IN A HISTORY REGISTER IN A PREDICTION SYSTEM FOR A PROCESSOR-BASED SYSTEM

(71) Applicant: QUALCOMM Incorporated, San Diego, CA (US)

(72) Inventors: Anil Krishna, Lakeway, TX (US); Yongseok Yi, San Diego, CA (US); Vignyan Reddy Kothinti Naresh, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 86 days.

(21) Appl. No.: 15/685,519

(22) Filed: Aug. 24, 2017

(65) Prior Publication Data
US 2019/0065196 A1 Feb. 28, 2019

(51) Int. Cl.
G06F 9/30 (2018.01)
G06F 9/38 (2018.01)
G06F 9/32 (2018.01)

(52) U.S. Cl.
CPC ...... *G06F 9/30058* (2013.01); *G06F 9/30149* (2013.01); *G06F 9/3844* (2013.01);
(Continued)

(58) Field of Classification Search
CPC ....... G06F 9/3806; G06F 9/3844; G06F 9/322
(Continued)

(56) References Cited

U.S. PATENT DOCUMENTS 7,689,816 B2 3/2010 Levitan
7,725,692 B2 5/2010 Nair
(Continued)

FOREIGN PATENT DOCUMENTS

EP 2937777 A2 10/2015

OTHER PUBLICATIONS

Michaud, Pierre, "A PPM-like, Tag-based Branch Predictor," Journal of Instruction-Level Parallelism, vol. 7, Jan. 1, 2005, 10 pages.
(Continued)

*Primary Examiner* — Yuqing Xiao
(74) *Attorney, Agent, or Firm* — Withrow & Terranova

(57) ABSTRACT

Reduced logic level operation folding of context history in a history register in a prediction system for a processor-based system is disclosed. The prediction system includes a prediction circuit employing reduced operation folding of the history register for indexing a prediction table containing prediction values used to process a consumer instruction when value has not yet been resolved. To avoid the requirement to perform successive logic folding operations to produce a folded context history of a resultant reduced bit width, reduced logic level folding operation of the resultant reduced bit width is employed. Reduced logic level folding operation of the resultant reduced bit width involves using current folded context history from previous contents of a history register as basis for determining a new folded context history. In this manner, logic folding of the history register is faster and operates with reduced power consumption as a result of fewer logic operations.

45 Claims, 12 Drawing Sheets

(52) U.S. Cl.
CPC ............ *G06F 9/3848* (2013.01); *G06F 9/322* (2013.01); *G06F 9/3806* (2013.01); *G06F 9/3861* (2013.01)

(58) Field of Classification Search
USPC .......................................................... 712/239
See application file for complete search history.

(56) References Cited

U.S. PATENT DOCUMENTS

| | | | | |
|---|---|---|---|---|
| 7,797,521 | B2* | 9/2010 | Eickemeyer | .......... G06F 9/3848 712/238 |
| 7,991,980 | B2 | 8/2011 | Uht et al. | |
| 8,892,852 | B2 | 11/2014 | Ishii | |
| 9,495,164 | B2 | 11/2016 | Levitan et al. | |
| 2007/0088936 | A1* | 4/2007 | Wilkerson | .............. G06F 9/383 712/227 |
| 2007/0239974 | A1* | 10/2007 | Park | ...................... G06F 9/3806 712/238 |
| 2008/0276081 | A1* | 11/2008 | Nair | ...................... G06F 9/3804 712/240 |
| 2010/0169626 | A1* | 7/2010 | Wang | .................... G06F 9/3806 712/239 |
| 2012/0124347 | A1* | 5/2012 | Dundas | ................. G06F 9/3804 712/239 |
| 2014/0281441 | A1* | 9/2014 | Manoukian | ........... G06F 9/3844 712/239 |
| 2015/0331691 | A1 | 11/2015 | Levitan et al. | |
| 2015/0363203 | A1* | 12/2015 | Lipasti | ................. G06F 9/3806 712/240 |

OTHER PUBLICATIONS

International Search Report and Written Opinion for PCT/US2018/045373, dated Oct. 31, 2018, 15 pages.

* cited by examiner

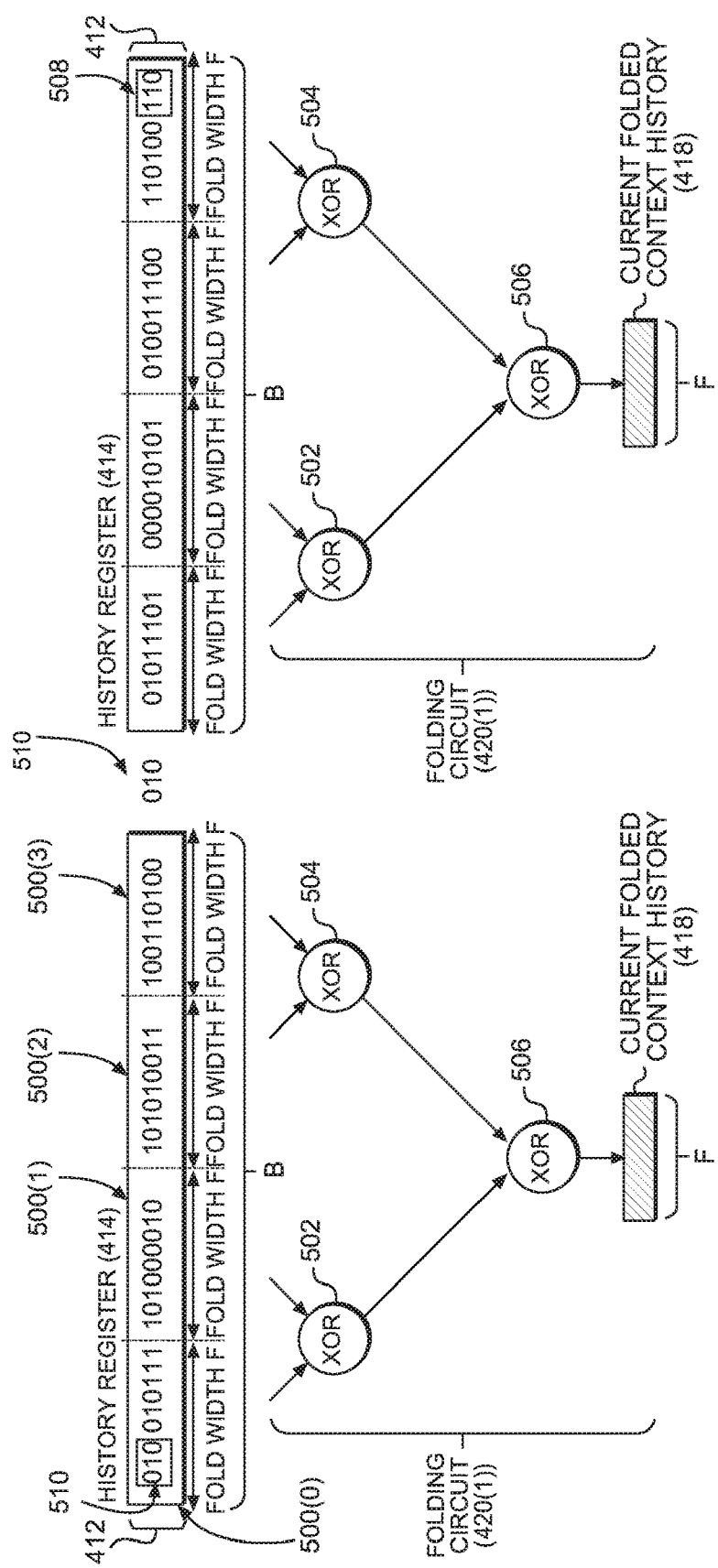

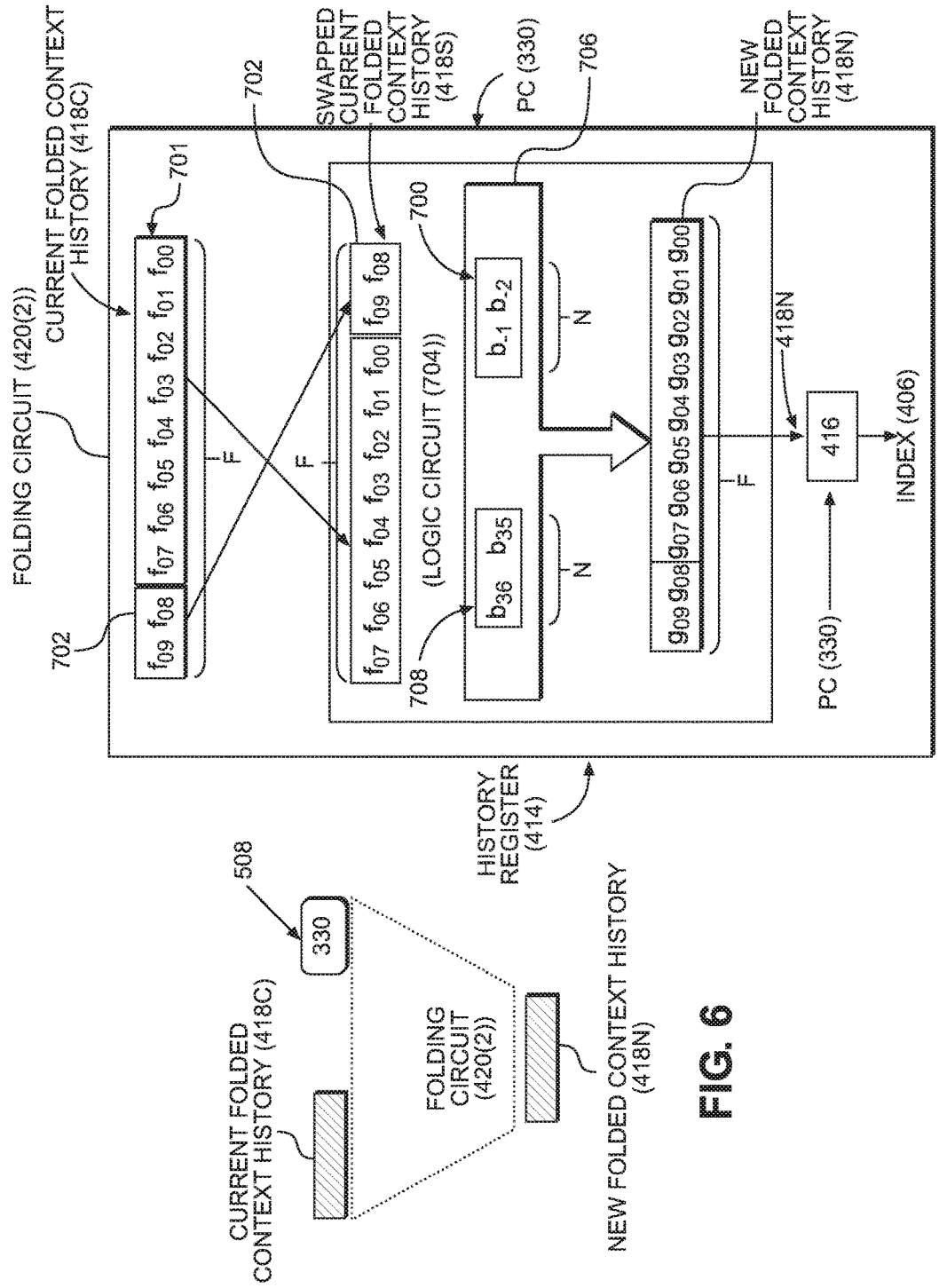

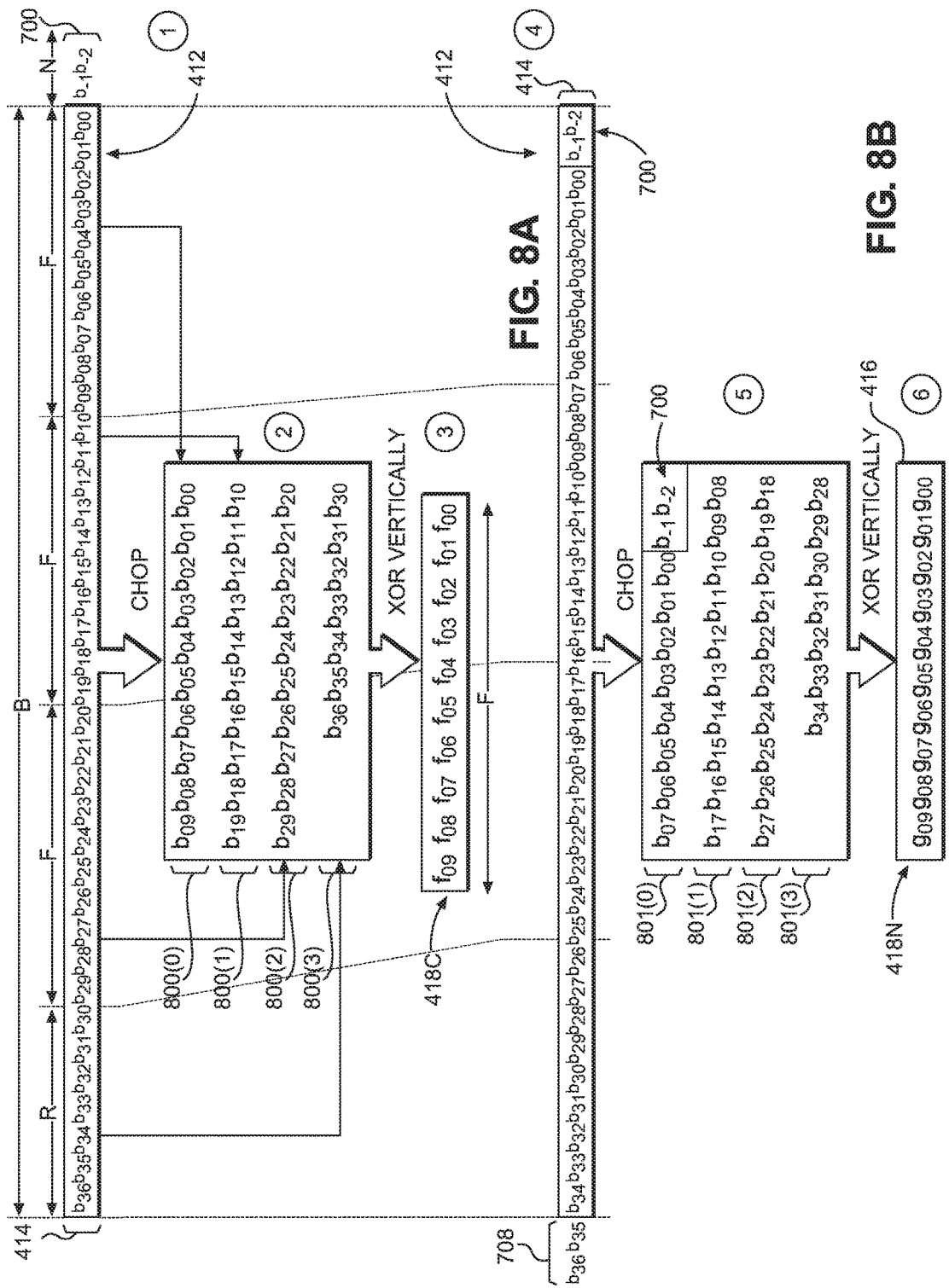

REDUCED LOGIC LEVEL OPERATION FOLDING OF CONTEXT HISTORY IN A HISTORY REGISTER IN A PREDICTION SYSTEM FOR A PROCESSOR-BASED SYSTEM

BACKGROUND

I. Field of the Disclosure

The technology of the disclosure relates to prediction-based circuits in central processing units (CPUs) for predicting unresolved produced values to be consumed by dependent instructions, and more particularly to successive register folding operations in prediction-based circuits for use in indexing prediction tables for predicting unresolved produced values.

II. Background

Instruction pipelining is a processing technique whereby the throughput of computer instructions being executed by a processor may be increased. In this regard, the handling of each instruction is split into a series of steps as opposed to each instruction being processed sequentially and fully executed before processing a next instruction. These steps are executed in an instruction pipeline composed of multiple stages. There are several cycles between the time an instruction is fetched from memory until the time the instruction is actually executed as the instruction flows through various pipeline stages of an instruction pipeline.

One approach for enhancing performance of CPUs and graphics processing units (GPUs) that include instruction pipelining is to utilize prediction logic to perform prediction-based functions such as branch predictions, value predictions, and load address predictions for executing load instructions and hardware data prefetches. In this manner, an instruction that consumes a value for its execution that is generated by another producing instruction can be processed based on a prediction value without having to be stalled to wait for the producing instruction to be fully executed. This may be particularly useful in CPUs and GPUs that employ out-of-order (OoO) instruction processing. In this regard, such prediction logic employed in CPUs and GPUs often relies on a program counter (PC) as a prime indexing mechanism into a predictor table to retrieve a predicted value to be used in the execution of a consuming instruction. In order to further isolate and uniquely identify the context of the PC for greater prediction accuracy, some form of context history may also be hashed together with the PC. A common form of context history is a history of what happened at the most recent n potential discontinuities in an executed instruction stream. One example of this is to simply store whether conditional branches were taken or not taken (e.g., 1 bit per potential discontinuity). Another, more sophisticated example is to store a target instruction executed at such potential discontinuities. In this latter case, in order to keep the size of the history register manageable, each such target instruction's address bits may first be hashed down to a fewer number of bits before being pushed into the history register. Thus, one typical way the history register is managed is as a First-In-First-Out (FIFO) queue of the most recent n PC hashes where the PCs meet some specific criterion (taken branches, for example). Once the history register is full, appending n hashed bits corresponding to a new PC into the history register causes the oldest h bits to be dropped.

An example of prediction logic that utilizes a PC and context history stored in a history register to retrieve a predicted value for an instruction is shown in FIG. 1. In this regard, FIG. 1 is a schematic diagram of an exemplary prediction circuit 100 that can be included in an instruction processing system in a CPU for providing predicted values 102 for an instruction 104 based on a PC 106 of the instruction 104 and a context history of the instruction 104. A prediction table 108 is provided that contains a plurality of tags 110 and corresponding predicted values 102. The prediction table 108 can be indexed by the tags 110. The predicted value 102 corresponding to the tag 110 is provided as a predicted value when a match or hit occurs between a searched tag and a tag 110 contained in the prediction table 108. In this example, there are two (2) uses of context history used to index the prediction table 108. The PC 106, along with a stored context history 112 in a history register 114, are hashed by an index hash 116 to form an index 118 into the prediction table 108. The context history 112 is also hashed with the PC 106 in a tag hash 120 to generate a search tag 122 to isolate the entry of interest (if present) from among all the tag 110 entries in the prediction table 108. If the search tag 122 matches the tag 110 in the prediction table 108 at the location of the index 118, the predicted value 102 associated with the matching indexed tag 110 is provided as the predicted value 102.

The history register 114 may be designed to append either a hashed version of the context history 112 or a non-hashed, raw, version of the context history 112. The context history 112 may be used by itself or in conjunction with the PC 106 to index the prediction table 108 to retrieve a predicted value 102. In either case, the number of bits needed for the index 118 to index the prediction table 108 is log base 2 of the number of sets in the prediction table 108. The number of bits needed to be produced by the tag hash 120 to generate the search tag 122 depends on the number of bits in the tags 110 in the prediction table 108. These bit counts are often much smaller (e.g., below 10) than the number of bits employed by the history register 114, which may be tens, hundreds, or even thousands of bits, to establish good context. Therefore, the index hash 116 and the tag hash 120 in the prediction circuit 100 in FIG. 1 represent some form of a massive reduction circuitry that takes the context history 112 and shrinks it down to the necessary number of reduced bits before it can be employed as the index 118 and the search tag 122.

In this regard, FIG. 2 illustrates a conventional method of shrinking the context history 112 in the history register 114 in the prediction circuit 100 in FIG. 1 down to the necessary number of bits before it can be employed to generate the index 118 or the search tag 122 called exclusive OR (XOR) folding. XOR folding involves taking the whole (or a relevant section) of the history register 114, and chopping it up into a number of sections called folds 200. The bit size or width of the folds 200 is equal to the desired final bit size of a folded context history 202, which is shown as fold width i in FIG. 2. To reduce the number of bits XOR'ed together at one time, an XOR tree circuit 204 is employed that is configured to perform an XOR logic operation between a subset of the folds 200 to eventually produce the folded context history 202. If the folded context history 202 is not a full multiple of the fold 200 width, zeroes may be appended. This massive folding operation performed by the XOR tree circuit 204 is typically performed each time the context history 112 in the history register 114 is updated. The context history 112 may be updated often, perhaps every clock cycle or two as an example. When the prediction circuit 100 is activated to make a prediction, the predicted value 102 is hashed down into a handful of bits and pushed back into the history register 114 to update the context history 112 for the next prediction to be made.

This kind of XOR tree reduction performed by the XOR tree circuit 204 in FIG. 2 adds many levels of logic circuits to the prediction circuit 100 in FIG. 1. The problem becomes egregious as the history register 114 becomes longer. Increasing the length of the history register 114 can result in a more accurate branch prediction. However, increasing the length of the history register 114 can increase the number of levels of logic circuits in an XOR tree reduction, and thus increase timing paths through XOR folding. This timing problem can become especially problematic when the width to which the history register 114 is being folded down is very small. This issue can be mitigated by reducing the fold 200 width, but this may then result in a larger prediction table that is indexed by wider indexes 118 and search tags 122. In addition, XOR tree circuits 204 can consume a considerable amount of dynamic power considering that the XOR folding operation can be performed multiple times per cycle for different starting and ending widths.

SUMMARY OF THE DISCLOSURE

Aspects disclosed herein include reduced logic level operation folding of context history in a history register in a prediction system in a processor-based system. The prediction system may be an instruction processing system in a central processing unit (CPU) for predicting values for instructions to be processed in an instruction pipeline. The prediction system includes a prediction circuit that is configured to employ reduced operation folding of the history register to generate an index and/or tag for indexing a prediction table that contains prediction values. History folding is performed to index a prediction table having fewer entries than would be indexable by a bit width of the history register. These prediction values can be used by the instruction processing system to provide a prediction of a value needed to process a consuming instruction where the value has yet to be produced by a producer instruction. For example, the instruction processing system may be configured to process instructions out-of-order (OoO) whereby consuming instructions may be processed before producing instructions are fully executed. A predicted value is used in the processing of a consumer instruction to reduce or avoid stalling instruction processing of the consuming instruction until the predicted value is fully resolved by execution of the producing instruction. By reducing the operations needed to fold the history register, the timing paths of folding circuits in the prediction circuit are reduced without the need to increase a width of a folded context history register, thereby increasing the prediction table size.

In exemplary aspects disclosed herein, the context history stored in the history register of a given bit width is folded down to a folded context history of desired, resultant reduced bit width to be used to index a prediction table. New context information (i.e., new context bits) for a successive prediction operation can be shifted into the least significant bits of the context history in the history register, for example, so that a new folded context history is generated for indexing the prediction table for the successive prediction operation. Thus, the most significant bits of the context history are shifted out of the history register based on shifting in the new context information. To reduce the history register down to the folded context history of the resultant reduced bit width, the history register could be divided into history register segments of the resultant reduced bit width. The history register segments can then be logically and exclusively OR'ed (XOR) together through XOR logic operations. However, this would require successive XOR logic operations to be performed if the resultant bit width is such that dividing the history register results in more than two (2) history register segments. Performing successive logic folding operations to reduce the history register down to the desired, resultant reduced bit width increases the latency involved in prediction operations.

Thus, in exemplary aspects disclosed herein, to avoid the requirement to perform successive logic folding operations on divided history register segments to produce a folded context history of a resultant reduced bit width, a reduced logic level folding operation of the resultant reduced bit width is employed. In certain examples disclosed herein, the reduced logic level folding operation is achieved through a single logic level folding operation. Based on a recognition that a program counter (PC) for an instruction involving a prediction operation is reduced (e.g., hashed) down into a reduced number of bits and pushed back into the history register for a next prediction operation, a single logic level folding operation (e.g., an XOR logic operation) can be performed on a bit swapped current folded context history to arrive at the same result as would have resulted if the current context history in the history register was evenly divided and folded in a series of multiple logic operations of $\log_2 N$, wherein 'N' is the bit width of the history register. In this regard, the single logic level folding operation of the resultant reduced bit width involves using current folded context history from the previous contents of a history register as basis for determining a new folded context history. In one example, X most significant bits of a current folded context history are swapped to be provided as the X least significant bits of the current folded context history, where X is the number of reduced bits that are pushed back into the history register for a next prediction operation. A logic operation is then performed between the X least significant bits of the swapped folded context history and the new context bits shifted into the X least significant bits in the history register for a next prediction operation, and between one less than the X most significant bits of the swapped folded context history and the shifted out bits from the history register as a result of shifting in the new context bits into the history register. In this manner, the logic folding of the history register is faster, and operates with reduced power consumption as a result of requiring fewer logic operations. The single logic level folding operation is scalable to be independent of the size of the history register, and is independent of how many bits (X) are being shifted back into each generation of the history register on each prediction operation.

In this regard, in one exemplary aspect, a prediction circuit is provided. The prediction circuit comprises a prediction table circuit and a folding circuit. The prediction table circuit comprises a plurality of prediction entries each comprising a predicted value field configured to store a predicted value. The prediction table circuit further comprises an index input configured to receive an index, and a predicted value output configured to provide a predicted value for an instruction to be processed. The prediction table circuit is configured to provide a predicted value from a prediction entry among the plurality of prediction entries corresponding to the index on the index input. The folding circuit is configured to bit field swap N most significant bits of a current folded context history in a current folded context history register comprising F folded bits of a current context history in a history register having a B bit length, with N least significant bits of the current folded context history to provide a swapped current folded context history. The folding circuit is also configured to perform a logic operation on the swapped current folded context history with a logic word comprising N bits of a new context history and N bits of the current context history to generate a new folded context history of F bits. The prediction circuit is configured to generate the index based on the new folded context history.

In another exemplary aspect, a method of folding a context history used to provide a predicted value for an instruction to be executed in an instruction processing system is provided. The method comprises bit field swapping N most significant bits of a current folded context history in a current folded context history register comprising F folded bits of a current context history in a history register having a B bit length, with N least significant bits of the current folded context history to provide a swapped current folded context history. The method also comprises performing a logic operation on the swapped current folded context history with a logic word comprising N bits of a new context history and N bits of the current context history to generate a new folded context history of F bits. The method further comprises generating an index based on the new folded context history, and indexing a prediction entry among a plurality of prediction entries in a prediction table circuit corresponding to the index. Each of the plurality of prediction entries comprises a predicted value field configured to store a predicted value. The method further comprises providing the predicted value from the indexed prediction entry in the prediction table circuit to be used for processing the instruction.

In another exemplary aspect, a non-transitory computer-readable medium having stored thereon computer executable instructions which, when executed by a processor, cause the processor to bit field swap N most significant bits of a current folded context history in a current folded context history register comprising F folded bits of a current context history in a history register having a B bit length, with N least significant bits of the current folded context history to provide a swapped current folded context history. The computer executable instructions further cause the processor to perform a logic operation on the swapped current folded context history with a logic word comprising N bits of a new context history and N bits of the current context history to generate a new folded context history of F bits, and generate an index based on the new folded context history. The computer executable instructions further cause the processor to index a prediction entry among a plurality of prediction entries in a prediction table circuit corresponding to the index. Each of the plurality of prediction entries comprises a predicted value field configured to store a predicted value. The computer executable instructions further cause the processor to provide the predicted value from the indexed prediction entry in the prediction table circuit to be used for processing an instruction.

In another exemplary aspect, an instruction processing system for a processor is provided. The instruction processing system comprises one or more instruction pipelines each comprising an instruction fetch circuit configured to fetch instructions from an instruction memory, and an execution circuit configured to execute the fetched instructions. The instruction processing system also comprises a history register configured to store a current context history having a B bit length associated with a PC of a fetched instruction, and a current folded context history register configured to store a current folded context history comprising F folded bits of the current context history. The instruction processing system further comprises a prediction circuit. The prediction circuit is configured to bit field swap N most significant bits of the current folded context history in the current folded context history register with N least significant bits of the current folded context history in the current folded context history register to provide a swapped current folded context history in the current folded context history. The prediction circuit is further configured to perform a logic operation on the swapped current folded context history with a logic word comprising N bits of a new context history and N bits of the current context history to generate a new folded context history of F bits. The prediction circuit is also configured to generate an index based on the new folded context history, and index a prediction table circuit comprising a plurality of prediction entries each comprising a predicted value field configured to store a predicted value with the generated index to obtain the predicted value for the fetched instruction.

BRIEF DESCRIPTION OF THE FIGURES

FIG. 5A illustrates multiple logic level folding operations performed on history register segments of a resultant reduced bit width to produce a resultant folded context history and shifting in new context bits for a successive prediction operation into the least significant bits of the context history in the history register so that a new folded context history will be generated for a successive prediction operation;

FIG. 5B illustrates multiple logic level folding operations performed on history register segments of a resultant reduced bit width from a history register to produce a resultant folded context history;

FIG. 6 illustrates a reduced logic level folding operation on a new context history with shifted in new context bits in a history register in the prediction circuit in the instruction processing system of FIG. 3 to produce a resultant context history;

FIG. 7 illustrates an exemplary reduced logic level folding operation of a context history to a resultant reduced bit width that can be performed by the prediction circuit in the instruction processing system of FIG. 3, wherein a single logic level folding operation involves using current folded context history from previous contents of a history register as basis for determining a new folded context history;

FIG. 8A illustrates an exemplary multiple, successive XOR logic folding operation on a current context history in a history register to produce a folded context history;

FIG. 8B illustrates an exemplary reduced XOR logic folding operation on the current context history generated in FIG. 8A based on new context bits shifted into the current context history in the history register to produce a new folded context history;

DETAILED DESCRIPTION

Figure 1:
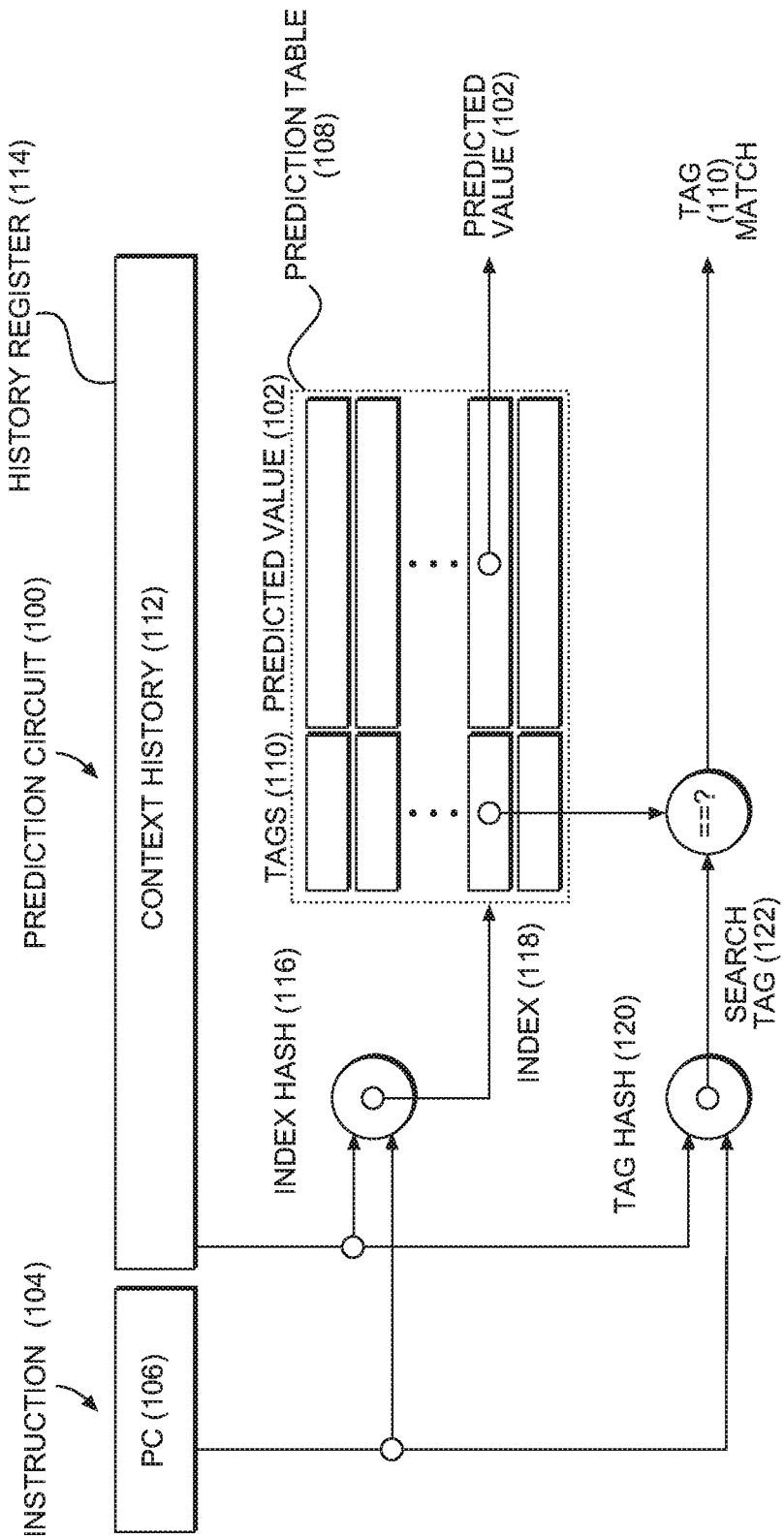
FIG. 1 is a schematic diagram of an exemplary prediction circuit that can be included in an instruction processing system in a central processing unit (CPU) for providing predicted values for an instruction based on a program counter (PC) of the instruction and a context history.
Figure 2:
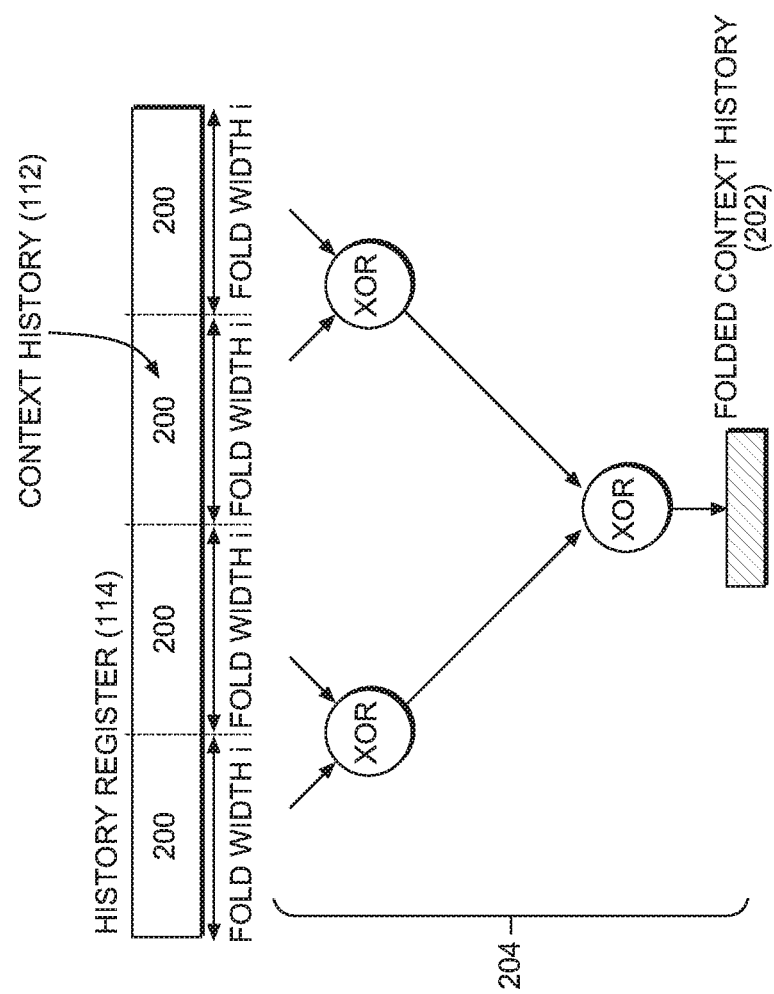
FIG. 2 illustrates exclusive OR (XOR)-based logic operation folding of context history in a history register to reduce bit size of the context history to be used for indexing a prediction table in the prediction circuit in FIG. 1.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed herein include reduced logic level operation folding of context history in a history register in a prediction system in a processor-based system. The prediction system may be an instruction processing system in a central processing unit (CPU) for predicting values for instructions to be processed in an instruction pipeline. The prediction system includes a prediction circuit that is configured to employ reduced operation folding of the history register to generate an index and/or tag for indexing a prediction table that contains prediction values. History folding is performed to index a prediction table having fewer entries than would be indexable by a bit width of the history register. These prediction values can be used by the instruction processing system to provide a prediction of a value needed to process a consuming instruction where the value has yet to be produced by a producer instruction. For example, the instruction processing system may be configured to process instructions out-of-order (OoO) whereby consuming instructions may be processed before producing instructions are fully executed. A predicted value is used in the processing of a consumer instruction to reduce or avoid stalling instruction processing of the consuming instruction until the predicted value is fully resolved by execution of the producing instruction. By reducing the operations needed to fold the history register, the timing paths of folding circuits in the prediction circuit are reduced without the need to increase a width of a folded context history register, thereby increasing the prediction table size.

In exemplary aspects disclosed herein, the context history stored in the history register of a given bit width is folded down to a folded context history of desired, resultant reduced bit width to be used to index a prediction table. New context information (i.e., new context bits) for a successive prediction operation can be shifted into the least significant bits of the context history in the history register, for example, so that a new folded context history is generated for indexing the prediction table for the successive prediction operation. Thus, the most significant bits of the context history are shifted out of the history register based on shifting in the new context information. To reduce the history register down to the folded context history of the resultant reduced bit width, the history register could be divided into history register segments of the resultant reduced bit width. The history register segments can then be logically and exclusively OR'ed (XOR) together through XOR logic operations. However, this would require successive XOR logic operations to be performed if the resultant bit width is such that dividing the history register results in more than two (2) history register segments. Performing successive logic folding operations to reduce the history register down to the desired, resultant reduced bit width increases the latency involved in prediction operations.

Thus, in exemplary aspects disclosed herein, to avoid the requirement to perform successive logic folding operations on divided history register segments to produce a folded context history of a resultant reduced bit width, a reduced logic level folding operation of the resultant reduced bit width is employed. In certain examples disclosed herein, the reduced logic level folding operation is achieved through a single logic level folding operation. Based on a recognition that a program counter (PC) for an instruction involving a prediction operation is reduced (e.g., hashed) down into a reduced number of bits and pushed back into the history register for a next prediction operation, a single logic level folding operation (e.g., an XOR logic operation) can be performed on a bit swapped current folded context history to arrive at the same result as would have resulted if the current context history in the history register was evenly divided and folded in a series of multiple logic operations of $\log_2 N$, wherein 'N' is the bit width of the history register. In this regard, the single logic level folding operation of the resultant reduced bit width involves using current folded context history from the previous contents of a history register as basis for determining a new folded context history. In one example, X most significant bits of a current folded context history are swapped to be provided as the X least significant bits of the current folded context history, where X is the number of reduced bits that are pushed back into the history register for a next prediction operation. A logic operation is then performed between the X least significant bits of the swapped folded context history and the new context bits shifted into the X least significant bits in the history register for a next prediction operation, and between one less than the X most significant bits of the swapped folded context history and the shifted out bits from the history register as a result of shifting in the new context bits into the history register. In this manner, the logic folding of the history register is faster, and operates with reduced power consumption as a result of requiring fewer logic operations. The single logic level folding operation is scalable to be independent of the size of the history register, and is independent of how many bits (X) are being shifted back into each generation of the history register on each prediction operation.

Before discussing the examples of prediction operations involving reduced logic level operation folding of a context history to be used as an index to obtain a predicted value for processing an instruction starting at FIG. 6, a discussion of an instruction processing system and prediction circuit that can be employed therein to provide predicted values for instructions is first described with regard to FIGS. 3-5B.

Figure 3:
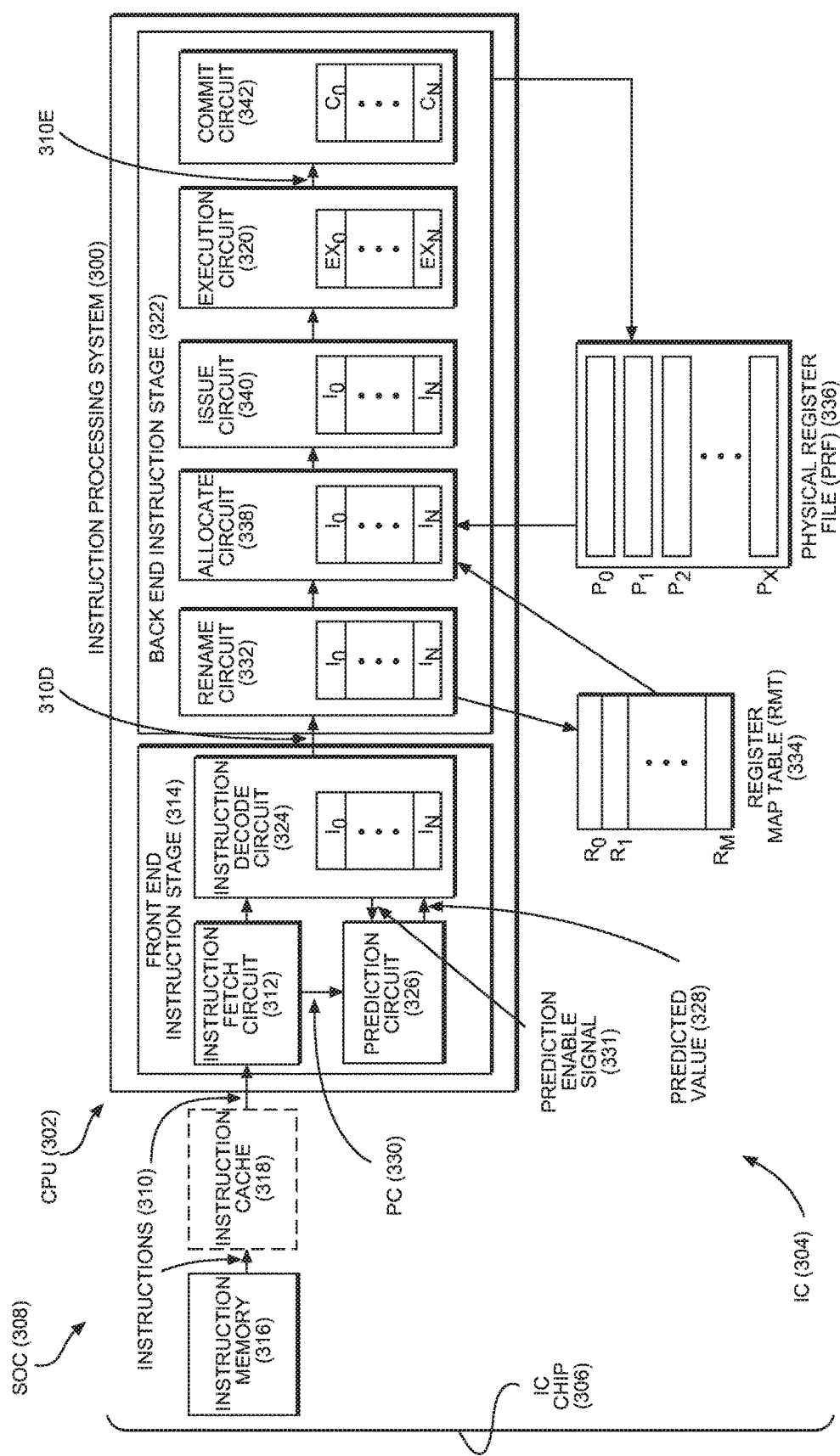
FIG. 3 is a schematic diagram of an exemplary CPU that includes an instruction processing system that includes a prediction circuit configured to perform a prediction operation involving reduced logic level operation folding of a context history in a history register to be used to index a prediction table to obtain a predicted value for processing an instruction.

In this regard, FIG. 3 is a block diagram of an exemplary instruction processing system 300 provided in a CPU 302 that is configured to perform a prediction operation involving reduced logic level operation folding of a context history in a history register to be used to index a prediction table to obtain a predicted value for processing an instruction. The CPU 302 may be provided as an integrated circuit (IC) 304 in an IC chip 306, such as a system-on-a-chip (SoC) 308 as an example. The instruction processing system 300 is configured to process instructions to be executed by the CPU 302. In this regard, instructions 310 are fetched by an instruction fetch circuit 312 provided in a front end instruction stage 314 of the instruction processing system 300 in this example from an instruction memory 316. The instruction memory 316 may be provided in or as part of a system memory in the CPU 302 as an example. An instruction cache 318 may also be provided in the CPU 302, as shown in FIG. 3, to cache the instructions 310 from the instruction memory 316 to reduce latency in the instruction fetch circuit 312 fetching the instructions 310. In this example, the instruction fetch circuit 312 is configured to provide the fetched instructions 310 into one or more instruction pipelines $I_0$-$I_N$ in the instruction processing system 300 to be pre-processed before the fetched instructions 310 reach an execution circuit 320 in a back end instruction stage 322 in the instruction processing system 300 to be executed. In this example, the CPU 302 is an out-of-order (OoO) processor (OOP) that is configured to execute instructions 310 out of order. The instruction pipelines $I_0$-$I_N$ are provided across different processing circuits or stages of the instruction processing system 300 to pre-process and process the instructions 310 in a series of steps that perform concurrently to increase throughput prior to execution of the instructions 310 in the execution circuit 320.

With continuing reference to FIG. 3, the front end instruction stage 314 of the instruction processing system 300 in this example also includes an instruction decode circuit 324. The instruction decode circuit 324 is configured to decode the fetched instructions 310 fetched by the instruction fetch circuit 312 into decoded instructions 310D. As part of the decoding, the instruction decode circuit 324 is configured to determine the type of instruction 310 and actions required, which in turn is used to determine in which instruction pipeline $I_0$-$I_N$ the instruction 310 should be placed. The decoded instructions 310D are provided to the back end instruction stage 322 for further processing and execution. However, if the decoded instruction 310D requires information as part of an operand to be able to be further processed that is not yet available or resolved, the instruction decode circuit 324 in this example can interface with a prediction circuit 326 also provided in the front end instruction stage 314. The prediction circuit 326 is configured to speculate or predict a value ("prediction value") for the decoded instruction 310D to be processed. For example, decoded instructions 310D may have an operand requiring a value to be processed that is not yet available or resolved. For example, if the decoded instruction 310D is a conditional branch instruction, an operand of the conditional branch instruction may be a target address that has not yet been determined. For example, the target address may be an address calculated by another producing instruction that has yet to be fully executed when the conditional branch instruction is processed in an instruction pipeline $I_0$-$I_N$, and thus the target address is not yet resolved. As another example, the target address may be a pointer to a memory location that requires a load operation from memory. In either example, the prediction circuit 326 is configured to provide a speculative or predicted value 328 for the decoded instruction 310D to continue to be processed so that the decoded instruction 310D is not stalled. As will be discussed in more detail, the prediction circuit 326 relies on a PC 330 of the decoded instruction 310D for a value to be predicted for processing as an indexing mechanism to retrieve a predicted value to be used in the processing of the decoded instruction 310D. The instruction decode circuit 324 may be configured to generate a prediction enable signal 331 to activate operation of the prediction circuit 326 when a predicted value is required to be generated for a decoded instruction 310D.

With continuing reference to FIG. 3, in this example, after the fetched instructions 310 are decoded by the instruction decode circuit 324 in the front end instruction stage 314, the decoded instructions 310D are then placed in one or more of the instruction pipelines $I_0$-$I_N$ and are next provided to a rename circuit 332 in the back end instruction stage 322 of the instruction processing system 300. The rename circuit 332 is configured to determine if any register names in the decoded instructions 310D need to be renamed to break any register dependencies that would prevent parallel or out-of-order (OoO) processing of the instructions 310. The instruction processing system 300 in FIG. 3 is capable of processing instructions 310 out-of-order, if possible, to achieve greater throughput performance and parallelism. However, the number of architectural registers provided in the CPU 302 may be limited. In this regard, the rename circuit 332 provided in the back end instruction stage 322 is configured to call upon a register map table (RMT) 334 with registers $R_0$-$R_m$ to rename the logical source and destination register names to available physical register names $P_0$-$P_x$ in a physical register file (PRF) 336 that typically provides more registers than architectural registers available. An allocate circuit 338 in a next step of the back end instruction stage 322 reads the physical registers containing source operands from the PRF 336 to determine if the producing instruction 310 responsible for producing the value has been executed. If the producing instruction 310 has not yet been executed, the value will be received by the producing instruction 310 via a live forwarding path. An issue circuit 340 (also known as a "dispatch circuit") can dispatch instructions 310 out-of-order to execution units $E_{X0}$-$E_{XN}$ in the execution circuit 320 after identifying and arbitrating among instructions 310 that have all their source operations ready. A commit circuit 342 is also provided in the back end instruction stage 322 as a final stage configured to update the architectural and memory state of the CPU 302 for executed instructions 310E and to process exceptions caused by the executed instructions 310E.

A fetched instruction 310 in the instruction processing system 300 in FIG. 3 may have an operand that has a target value that is not yet produced, meaning unproduced. For example, the target may be an address or may be another calculated value yet to be produced. For example, a producing instruction that is responsible for producing the target value consumed by the instruction 310 may not have fully executed, and thus the target value may not yet be resolved. Rather than stalling the instruction 310 until the target value is produced, a prediction of the target value can be made and the instruction 310 can be further processed by the instruction processing system 300 based on the predicted value.

Figure 4:
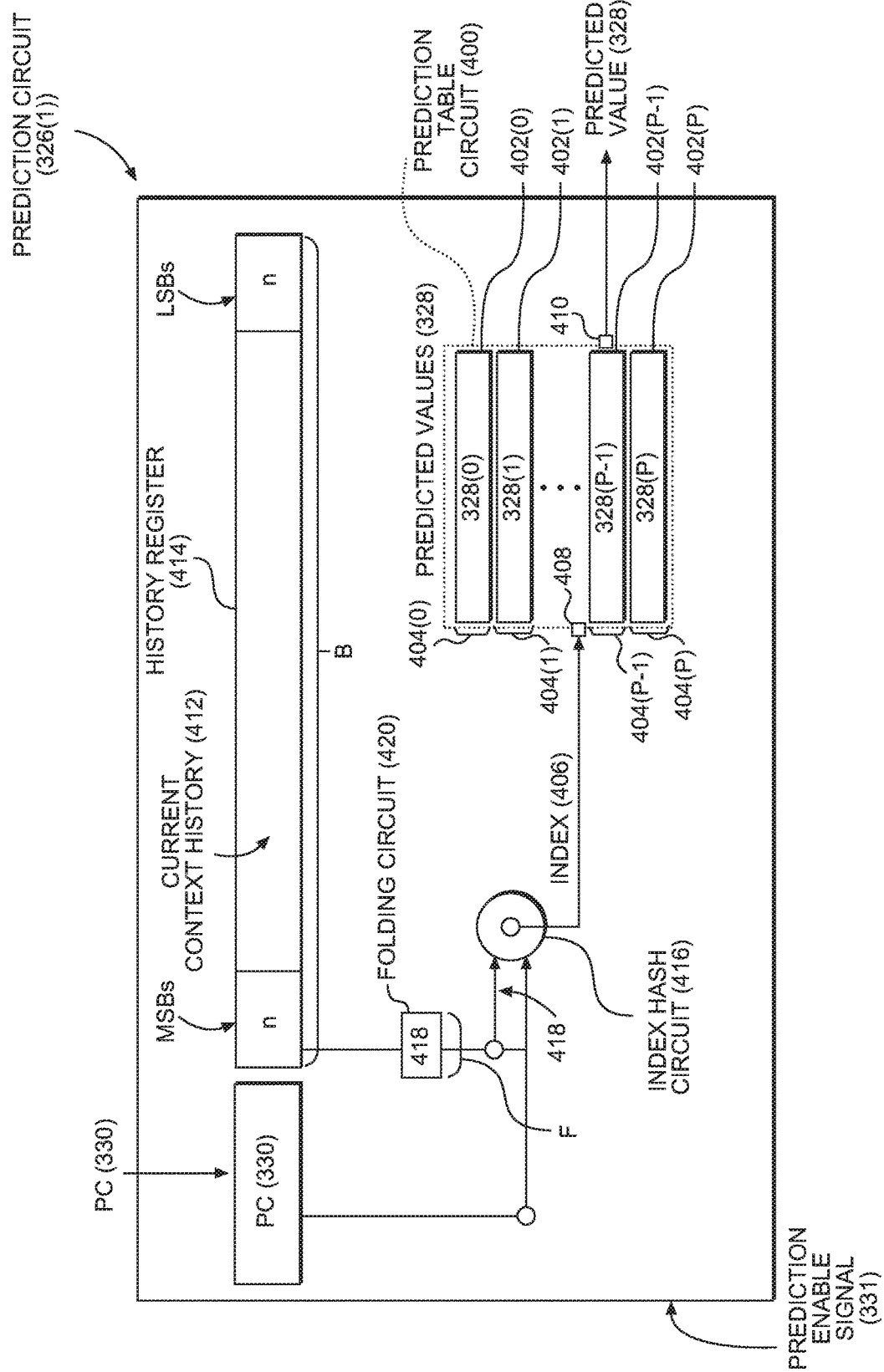
FIG. 4 is a schematic diagram of an exemplary prediction circuit that can be employed as the prediction circuit in the instruction processing system in FIG. 3.

In this regard, FIG. 4 is a schematic diagram of an example of a prediction circuit 326(1) that can be employed as the prediction circuit 326 in the instruction processing system 300 in FIG. 3. As will be discussed in more detail below, the prediction circuit 326(1) is configured to perform a prediction operation for an instruction employing reduced logic level operation folding of a context history to be used as an index to obtain a predicted value for processing an instruction. The prediction operation involves providing the predicted value 328 for the instruction 310 in the instruction processing system 300 in FIG. 3 in this example. However, note that the instruction 310 to be processed can be an instruction 310 in the instruction processing system 300 in FIG. 3, but the prediction circuit 326(1) is not limited to being included in the instruction processing system 300 in FIG. 3.

With continuing reference to FIG. 4, the prediction circuit 326(1) includes a prediction table circuit 400. The prediction table circuit 400 is a memory table in this example, but could be any other type of memory structure. The prediction table circuit 400 is configured to store a plurality of predicted values 328(0)-328(P) in a respective plurality of predicted value fields 402(0)-402(P) in respective prediction entries 404(0)-404(P), where the number of prediction entries is P+1. Thus, P+1 predicted values 328(0)-328(P) can be stored in the prediction table circuit 400. The prediction entries 404(0)-404(P) are accessible by an index 406. In this regard, the prediction table circuit 400 contains an index input 408 that is configured to receive the index 406 based on the instruction 310 for which a predicted value 328 is to be provided for further processing of the instruction 310. The predicted values 328(0)-328(P) were previously updated in the prediction table circuit 400 based on previous resolved values for instructions 310. The PC 330 of the instruction 310 is provided to the prediction table circuit 400. The index 406 addresses one of the prediction entries 404(0)-404(P) in the prediction table circuit 400. For example, if P=255 meaning that the prediction table circuit 400 contains 256 prediction entries 404(0)-404(P), the index 406 may be eight (8) bits to be able to index all 256 prediction entries 404(0)-404(P). In response to the index 406 provided on the index input 408 to address a particular prediction entry 404(0)-404(P), the predicted value 328(0)-328(P) stored in the addressed prediction entry 404(0)-404(P) is provided on a predicted value output 410. The predicted value 328(0)-328(P) can then be used for further processing of the instruction 310 corresponding to the PC 330.

With continuing reference to FIG. 4, the prediction table circuit 400 is configured to generate the index 406 for indexing the prediction table circuit 400 based on the current PC 330 of the instruction 310 requiring a predicted value 328 for further processing without potentially stalling. In this example, the index 406 is based on a hash operation performed on the PC 330 of the instruction 310 for which the predicted value 328 is to be provided for further processing and a current context history 412 stored in a history register 414, which may be a First-In-First-Out (FIFO) buffer circuit for example. An index hash circuit 416 is provided in the prediction circuit 326(1) to generate the index 406 for indexing the prediction table circuit 400 based on a hashing of the PC 330 of the instruction 310 for a predicted value 328 to be provided and the current folded context history 418 generated by a folding circuit 420. As will be discussed in more detail below, the folding circuit 420 is configured to reduce or shrink down the bit width of the current context history 412 of bit width B to a current folded context history 418 of bit width F before hashing with the PC 330 of the instruction 310 for the predicted value 328 to be provided.

The index hash circuit 416 may be configured according to a desired algorithm or process to transform and/or reduce the bits of the PC 330 and the current context history 412 folded down to the index 406 having a reduced bit width. It may also be desired to use the same PC 330 and history register 414 to index other prediction table circuits.

Thus, the prediction table circuit 400 is configured to provide a predicted value 328 to be used in further processing of an instruction 310 at the PC 330 that is based on the PC 330 and a folded version of the current context history 412 of the instruction processing system 300, which is the current folded context history 418. This is because the predicted value 328 accessed for the instruction 310 was previously stored in a particular prediction entry 404(0)-404(P) also based on the index 406 that resulted from the instruction 310 at the PC 330 being previously executed and the current context history 412 at the time of its previous execution. Thus, the predicted value 328 provided by the prediction circuit 326(1) to be used to process an instruction 310 at the PC 330 may be more accurate, because the prediction circuit 326(1) is configured to provide a predicted value 328 that is related to a previously stored predicted value 328 based on a previous execution of the same instruction 310 at the PC 330 and the current context history 412 at the time of the previous execution. If an instruction 310 was previously executed multiple times with different context histories resulting in different indexes 406, multiple predicted values 328(0)-328(P) may be stored in the prediction table circuit 400 associated with the PC 330.

With continuing reference to FIG. 4, the current context history 412 is a B bit width number that is a representation of the history of what happened at the most recent n potential discontinuities in an instruction stream executed by an instruction processing system, such as the instruction processing system 300 in FIG. 3. In this example, the current context history 412 is updated based on a target instruction's 310 PC 330 for which a predicted value 328 was obtained. In order to keep the size of the history register 414 manageable, the target instruction's 310 PC 330 is hashed down to fewer hashed bits h than the bit width of the PC 330 and then pushed into the history register 414. For example, the history register 414 can be managed as a First-In-First-Out (FIFO) queue of the most recent n PC 330 hashes where the PC 330 meets some specific criterion (e.g., taken branches). Once the history register 414 is full, appending the n hashed bits corresponding to a new PC 330 into the history register 414 causes the oldest n hashed bits to be dropped. In this example, the n hashed bits corresponding to a new PC 330 are shifted into the least significant bits (LSBs) of the history register 414 thereby shifting out the oldest n hashed bits from the most significant bits (MSBs) of the history register 414. This is shown by example in FIGS. 5A and 5B, which will now be described.

As discussed above, the folding circuit 420 in the prediction circuit 326(1) in FIG. 4 is configured to fold down the current context history 412 in the history register 414 to a reduced bit width of F bits in this example as part of a prediction operation before being hashed with the PC 330 by the index hash circuit 416 to produce the index 406 for indexing the prediction table circuit 400. FIG. 5A illustrates one example of a folding circuit 420(1) that can be employed as the folding circuit 420 in the prediction circuit 326(1) in FIG. 4. The folding circuit 420(1) is configured to fold down (i.e., reduce) the bits of the current context history 412 in the history register 414 using multiple logic level folding operations as opposed to a reduced logic level folding operation that may be more desirable to reduce processing time and power consumption. In this regard, as shown in FIG. 5A, the history register 414 in this example is B bits wide, where B=36 bits in this example. The history register 414 contains a current context history 412 of '010010111 101000010 101010011 100110100' in this example. In this example, it is desired to reduce the current context history 412 down to a current folded context history 418 of F bits that is ¼ the original size of the history register 414 in this example, wherein F=9 bits. Thus, as shown in FIG. 5A, the history register 414 is divided into four (4) equal context history segments 500(0)-500(3) of fold width F, where F=9 bits. An XOR logic operation 502 is performed between context history segments 500(0) and 500(1), and a separate XOR logic operation 504 is performed between context history segments 500(1) and 500(2). Then, another successive XOR logic operation 506 is performed on results of the XOR logic operations 502, 504 to produce the current folded context history 418. Thus, the folding circuit 420(1) in FIG. 5A has two (2) logic folding operation levels to generate the current folded context history 418.

Then, as shown FIG. 5B, n hashed bits 508 (e.g., 3 bits in this example) of the PC 330 are shifted into the LSBs of the history register 414 to form a new current context history 412. N hashed bits 510 of the current context history 412 in the history register 414 shown in FIG. 5A are shifted out of the history register 414 as shown in FIG. 5B to update the current context history 412 with a new current context history 412. The new current context history 412 can be used to generate the index 406 in the prediction circuit 326(1) in FIG. 4, load new predicted values 328 in the prediction table circuit 400, and/or index the prediction table circuit 400 to provide a predicted value 328 from the prediction table circuit 400.

Providing multiple levels of logic operations in the folding circuit 420(1) becomes more problematic as the history register 414 becomes longer. Increasing the length of the history register 414 can result in a more accurate branch prediction. However, increasing the length of the history register 414 would increase the number of levels of logic operations in the folding circuit 420(1) in FIGS. 5A and 5B, thus increasing timing paths. This increased timing can become especially problematic when the width to which the history register 414 is being folded down to is very small. This issue can be mitigated by reducing the fold width, but this may then result in larger prediction table circuits that are indexed by wider indexes. In addition, multiple levels of logic operations in a folding circuit can consume a considerable amount of dynamic power considering that the logic operations in the folding circuit may be performed multiple times per cycle for different starting and ending widths.

Thus, in exemplary aspects disclosed herein, to avoid the requirement to perform successive logic folding operations on divided history register segments, such as shown in FIGS. 5A and 5B to produce a folded context history of a resultant reduced bit width, a folding circuit that provides reduced logic level folding operation of the resultant reduced bit width is employed. FIGS. 6 and 7 illustrate a folding circuit 420(2) that can be employed as the folding circuit 420 in the prediction circuit 326(1) in FIG. 4 that employs a reduced logic level folding operation to generate a new folded context history 418N to be used to generate the index 406 for indexing the prediction table circuit 400. As shown in FIG. 6 and as will be described in more detail below, the folding circuit 420(2) performs a folding operation to create a new folded context history 418N to be used to create the index 406 in FIG. 4 using a current folded context history 418C generated from the current context history 412 of the history register 414 as opposed to having to perform multiple levels of logic operations to fold the current context history 412 stored in the history register 414. The folding circuit 420(2) creates a new folded context history 418N to be used for a prediction operation based on performing a logic operation between n hashed bits 508 of the PC 330 and the current folded context history 418C that was previously generated by the prediction circuit 326(1) in FIG. 4 in a previous prediction operation. In this example, the folding circuit 420(2) is configured to generate the new folded context history 418N in a single logic level operation. A logic level includes a serially encountered combinational logic gate, such as an AND, NAND, OR, NOR, or XOR logic gate. Thus for example, three (3) logic levels include three (3) serially encountered logic gates. The number of logic levels may be measured by the number of serial inverter circuit equivalents that a combinational logic circuit can be reduced to. Thus in this example, the folding circuit 420(2) may only require a single logic level of logic circuits to perform the logic operation between the n hashed bits 508 of the PC 330 and the current folded context history 418C that was previously generated by the prediction circuit 326(1). A single logic level in the folding circuit 420(2) means that the folding circuit 420(2) includes a single gate circuit level between an input and an output in the folding circuit 420(2). In this example, the folding circuit 420(2) does not perform successive logic operations to create the new folded context history 418N based on the current folded context history 418C. If the folding circuit 420(2) were to have multiple logic levels, this would mean that multiple gate circuit levels would exist between an input and an output in the folding circuit 420(2) where successive logic operations were performed on signals. Thus, the signals in the folding circuit 420(2) could have more than one (1) voltage level or state between the input and output of the folding circuit 420(2).

FIG. 7 illustrates more exemplary detail of the folding circuit 420(2) in FIG. 6 that can be included in the prediction circuit 326(1) in FIG. 4. FIG. 7 illustrates an example of the folding circuit 420(2) that can create the new folded context history 418N based on performing a logic operation performed between the n hashed bits 508 of the PC 330 and the current folded context history 418C. In this regard, the current folded context history 418C is shown stored in a current folded context history 701 as bits $f_{09}$-$f_{00}$ (i.e., '$f_{09}$ $f_{08}$ $f_{07}$ $f_{06}$ $f_{05}$ $f_{04}$ $f_{03}$ $f_{02}$ $f_{01}$ $f_{00}$') of F bit width in this example, where F=10. As will be discussed in more detail below, based on a recognition that the PC 330 for an instruction 310 involving a prediction operation is reduced (e.g., hashed) down into a new context history 700 of a reduced number of n hashed bits of bit width N, where N=2 in this example, and pushed back into the history register 414 for a next prediction operation, a single logic level folding operation (e.g., an XOR logic operation) can be performed on a bit swapped current folded context history 418S to arrive at the same result as would have resulted if the current context history 412 in the history register 414 was divided into context history segments and folded in a series of multiple logic operations of $\log_2 B$, wherein 'B' is the bit width of the history register 414, such as shown and previously discussed with regard to FIGS. 5A and 5B.

With continuing reference to FIG. 7, N MSBs of the current folded context history 418C stored in a current folded context history register 702 are bit swapped with the remaining LSBs of the current folded context history 418C such that bits '$f_{07}$ $f_{06}$ $f_{05}$ $f_{04}$ $f_{03}$ $f_{02}$ $f_{01}$ $f_{00}$ $f_{09}$ $f_{08}$' are stored as the swapped current folded context history 418S in the current folded context history register 702. A logic circuit 704 in the folding circuit 420(2) is then employed to perform a logic operation with the swapped current folded context history 418S. The logic circuit 704 performs a logic operation on the swapped current folded context history 418S with a logic word 706 comprising a new context history 700 that is comprised of N bits of n hashed bits, shown as '$b_{-1}$, $b_{-2}$' in this example, and N MSBs 708 of the current context history 412, shown as '$b_{36}$, $b_{35}$' in this example, to generate the new folded context history 418N, shown as F bits '$g_{09}$ $g_{08}$ $g_{07}$ $g_{06}$ $g_{05}$ $g_{04}$ $g_{03}$ $g_{02}$ $g_{01}$ $g_{00}$') in this example. As will be described in more detail below, the new folded context history 418N is the same result as would have resulted if the current context history 412 in the history register 414 was evenly divided and folded in a series of multiple logic operations of $\log_2$ N, wherein 'N' is the bit width of the history register 414. The new folded context history 418N can then be hashed with the PC 330 by the index hash circuit 416 in the prediction circuit 326(1), as previously illustrated and described with respect to FIG. 4, to generate the index 406 for indexing the prediction table circuit 400 to provide a predicted value 328. In this manner, the folding circuit 420(2) provides logic folding of the history register 414 faster, and with reduced power consumption as a result of requiring fewer logic operations. The new folded context history 418N can then be stored as the current folded context history 418C for a new prediction operation. The single logic level folding operation performed by the folding circuit 420(2) is scalable to be independent of the size of the history register 414, and is independent of how many bits are being shifted back into each generation of the history register 414 on each prediction operation.

Figure 9A:
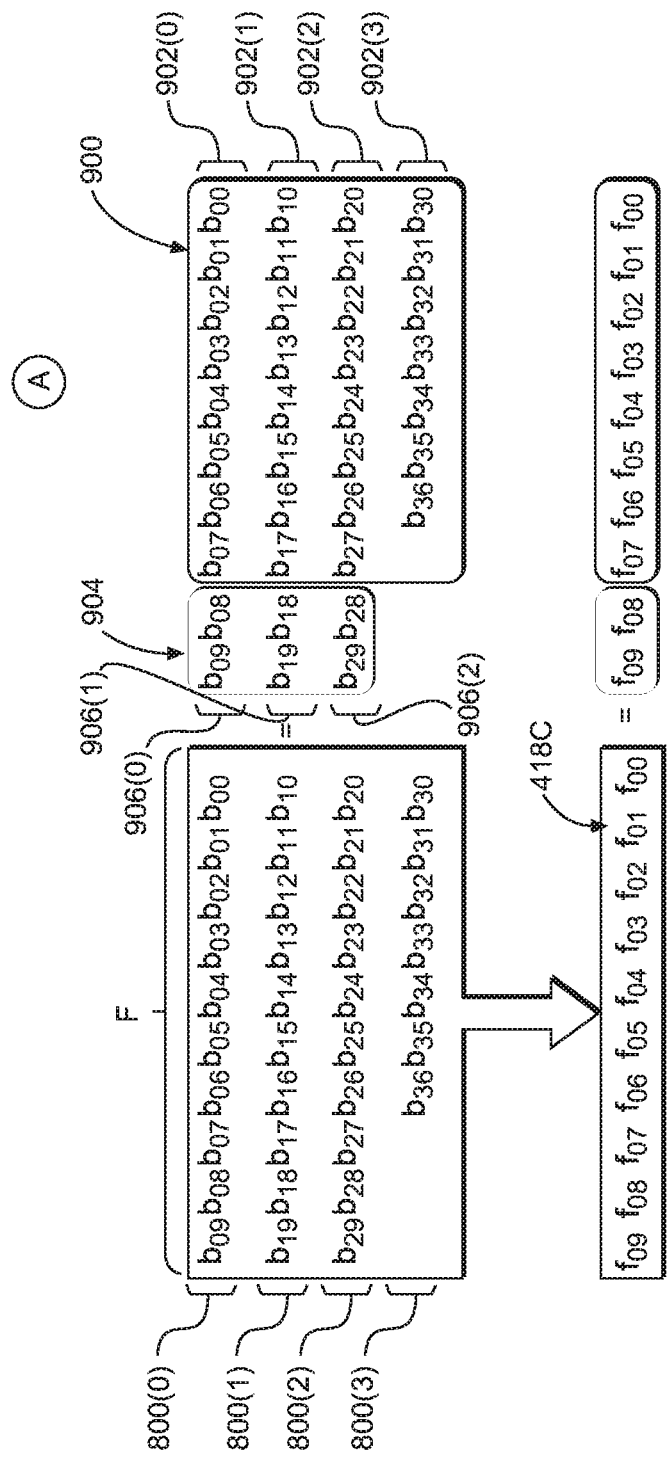
FIGS. 9A and 9B illustrate how the new folded context history in FIG. 8B can be alternatively generated with a reduced XOR logic folding operation based on new context bits shifted into the current context history in the history register to produce the new folded context history.
Figure 9B:
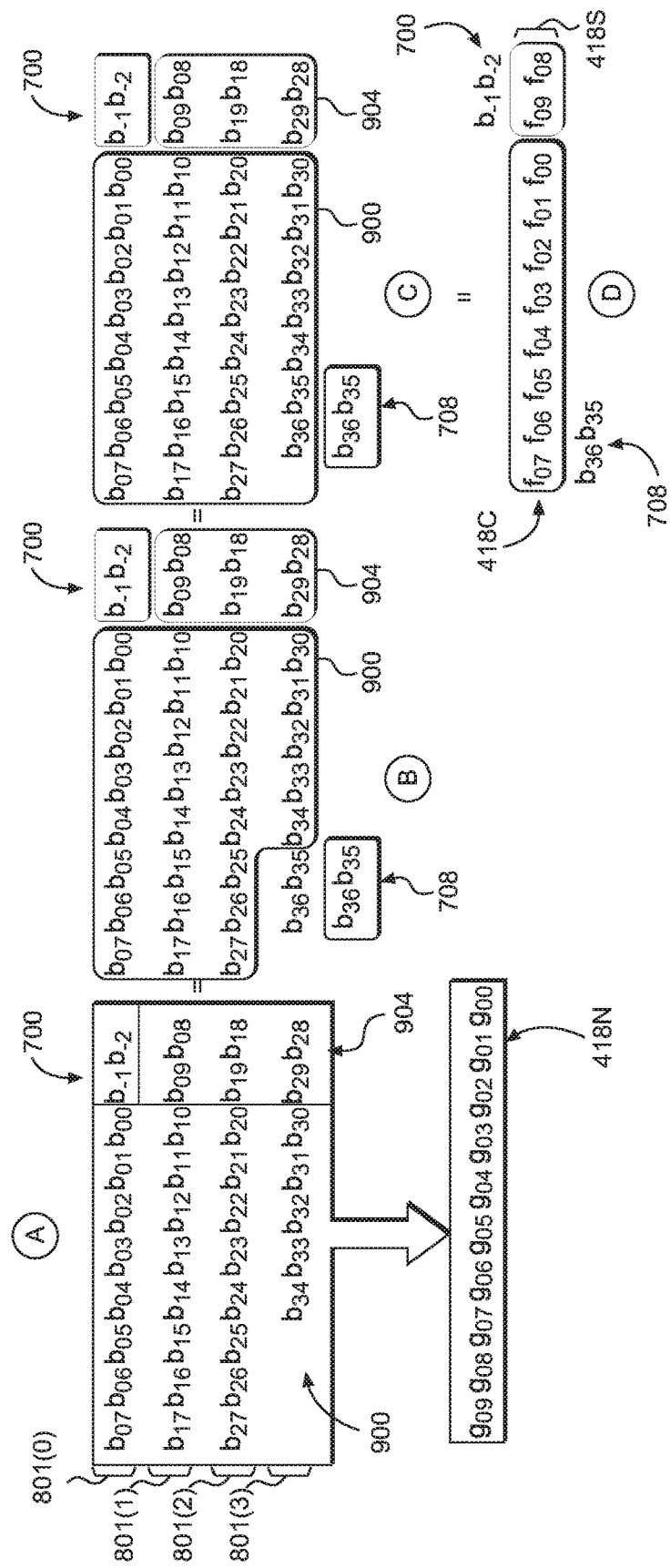

To explain further how the folding circuit 420(2) in FIGS. 6 and 7 can perform a folding operation to create a new folded context history 418N using a current folded context history 418C and produce the same result as would have resulted if the current context history 412 in the history register 414 was evenly divided and folded in a series of multiple logic operations, FIGS. 8A-9B are provided. FIG. 8A illustrates an exemplary multiple, successive XOR logic folding operation on a current context history 412 in the history register 414 to produce the current folded context history 418C without employing the reduced logic level folding operation in FIGS. 6 and 7. FIG. 8B illustrates an exemplary reduced XOR logic folding operation on a new context history 700 based on the new context history 700 shifted into the previous current context history 412 in the history register 414 in FIG. 8A to produce a new folded context history 418N. FIGS. 9A and 9B illustrate how the new folded context history 418N in FIG. 8B can alternatively be generated with a reduced XOR folding operation performed on the current folded context history 418C as opposed to having to perform multiple levels of logic operations like illustrated in FIGS. 9A and 9B to fold the current context history 412 in the history register 414.

In this regard, FIG. 8A illustrates an example of a folding operation as part of a prediction operation where a current context history 412 stored in the history register 414 of bits $b_{36}$ of B bit width, where B=37 in this example. A new context history 700 of N bits, shown as $b_{-1}$ and $b_{-2}$ is provided from the current PC 330 (not shown) in a first step to be shifted into the history register 414 for a next prediction operation. Because multiple successive logic folding operations are employed to a current folded context history 418C from the current context history 412 in this example, a first step of a prediction operation involves splitting or chopping the current context history 412 into multiple context history segments. In this example, in a second step (2), the current context history 412 is split into four (4) context history segments 800(0)-800(3) of up to F bits each, because the desired bit width of the current folded context history 418C is F bits. In this example, F=10. In this example, since the bit width B of the history register 414 is 37 bits, the current context history 412 is split into three (3) context history segments 800(0)-800(2) of F bits, where F=10, and one (1) context history segment 800(3) of the leftover bits of R bit width, where R=7 in this example. The context history segments 800(0)-800(3) are then logically XOR'ed, as shown in step (3), together using multiple, successive logical XOR operations like illustrated previously in FIGS. 5A and 5B, to generate the current folded context history 418C of F bit width as '$f_{09}$ $f_{08}$ $f_{07}$ $f_{06}$ $f_{05}$ $f_{04}$ $f_{03}$ $f_{02}$ $f_{01}$ $f_{00}$' of F bit width in this example, where F=10.

Then, in a next folding operation for a prediction operation shown in FIG. 8B as step (4), the new context history 700 ($b_{-1}$, $b_{-2}$) is shifted into N LSBs of the history register 414 thereby shifting out N MSBs 708 ($b_{36}$, $b_{35}$) of the current context history 412 from the history register 414 to create a new current context history 412 as shown in step (4) in FIG. 8B. Then, as shown in step (5) in FIG. 8B, the current context history 412 is again split into four (4) context history segments 801(0)-801(3) of up to F bits each, because the desired bit width of the current folded context history 418C is F bits. In this example, F=10. In this example, since the bit width B of the history register 414 is 37 bits, the current context history 412 is split into three (3) context history segments 801(0)-801(2) of F bits, where F=10, and one (1) context history segment 800(3) of the leftover bits of R bit width. Note however, that in context history segment 800(0), the N LSBs are the new context history 700 ($b_{-1}$, $b_{-2}$) that was previously shifted into the history register 414. Thus, the fourth context history segment 800(3) includes $b_{34}$-$b_{28}$ as opposed to $b_{36}$-$b_{30}$ like shown in a previous folding operation in FIG. 8A. The context history segments 801(0)-801(3) are then logically XOR'ed as shown in step (6) together using multiple, successive logical XOR operations like illustrated previously in FIGS. 5A and 5B, to generate the new folded context history 418N of F bit width as '$g_{09}$ $g_{08}$ $g_{07}$ $g_{06}$ $g_{05}$ $g_{04}$ $g_{03}$ $g_{02}$ $g_{01}$ $g_{00}$' in this example, where F=10.

FIGS. 9A and 9B illustrates how the new folded context history 418N in FIG. 8B can alternatively be generated with a reduced XOR logic folding operation based on the new context history 700 shifted into the current context history 412 in the history register 414. In this regard, FIG. 9A illustrates the same four (4) context history segments 800(0)-800(3) as shown in FIG. 8A as a result of splitting the current context history 412 in the history register 414 into context history segments 800. It is recognized in step (A) that the four (4) context history segments 800(0)-800(3) can also be split into a first matrix 900 of four (4) subset context history segments 902(0)-902(3) each of N bits (e.g., 2 bits) less than the F bit width of the four (4) context history segments 800(0)-800(3), as '$b_{07}$-$b_{00}$', '$b_{17}$-$b_{10}$', '$b_{27}$-$b_{20}$', and '$b_{37}$-$b_{30}$', respectively and a second matrix 904 of three (3) subset context history segments 906(0)-906(2) each of N bit width, as '$b_{09}$-$b_{08}$', '$b_{19}$-$b_{18}$', and '$b_{29}$-$b_{28}$', respectively.

Then, as shown in FIG. 9B, it is recognized that when the new context history 700 ($b_{-1}$, $b_{-2}$) is shifted into N LSBs of the history register 414 (FIG. 9A) to form an updated context history that is then split into the context history segments 801(0)-801(3) as shown in step (A) of FIG. 8B, the same first and second matrices 900, 904 are included in the context history segments 801(0)-801(3). That is, the first matrix 900 of '$b_{07}$-$b_{00}$', '$b_{17}$-$b_{10}$', '$b_{27}$-$b_{20}$', and '$b_{37}$-$b_{30}$', and the second matrix 904 of '$b_{09}$-$b_{08}$', '$b_{19}$-$b_{18}$', and '$b_{29}$-$b_{28}$' are present in the context history segments 801(0)-801(3). The context history segments 801(0)-801(3) could be logically XOR'ed in successive XOR logic operations to generate the new folded context history 418N of '$g_{09}\ g_{08}\ g_{07}\ g_{06}\ g_{05}\ g_{04}\ g_{03}\ g_{02}\ g_{01}\ g_{00}$' of F bit width. However, as shown in step (B) in FIG. 9B, it is recognized that if N MSBs 708 ($b_{36}$, $b_{35}$) are appended to context history segment 801(0) and then the same N MSBs 708 ($b_{36}$, $b_{35}$) as provided in another word and positioned to be logically XOR'ed with N MSBs 708 ($b_{36}$, $b_{35}$) appended to context history segment 801(0), that this is the equivalent to the folding of the original context history segments 801(0)-801(3) to produce the new folded context history 418N. Thus, as shown in step (C) in FIG. 9B, the logical XOR folding of the context history segments 801(0)-801(3) in the first and second matrixes 900, 904 will produce the same previous context history bits '$f_{07}\ f_{06}\ f_{05}\ f_{04}\ f_{03}\ f_{02}\ f_{01}\ f_{00}$'. The logical XOR folding of the context history segments 801(0)-801(3) in the first and second matrixes 900, 904 will produce the same previous context history bits '$f_{09}\ f_{08}$'. Thus, if N LSBs of the current folded context history 418C are bit swapped to produce a swapped current folded context history 418S '$f_{07}\ f_{06}\ f_{05}\ f_{04}\ f_{03}\ f_{02}\ f_{01}\ f_{09}\ f_{08}$', the new context history 700 ($b_{-1}$, $b_{-2}$) can be logically XORed with the N LSBs of the swapped context history 418S, and N MSBs 708 ($b_{36}$, $b_{35}$) can be logically XORed with bits '$f_{07}\ f_{06}$' of the current folded context history 418C, to produce the same resulting new folded context history 418N of F bit width as '$g_{09}\ g_{08}\ g_{07}\ g_{06}\ g_{05}\ g_{04}\ g_{03}\ g_{02}\ g_{01}\ g_{00}$' results. Thus, a logic word can be generated with the new context history 700 ($b_{-1}$, $b_{-2}$) and the N MSBs 708 ($b_{36}$, $b_{35}$) in the correct positions and a single logical XOR operation with the swapped current folded context history 418S of '$f_{07}\ f_{06}\ f_{05}\ f_{04}\ f_{03}\ f_{02}\ f_{01}\ f_{09}\ f_{08}$'. Thus, the new folded context history 418N of F bit width as '$g_{09}\ g_{08}\ g_{07}\ g_{06}\ g_{05}\ g_{04}\ g_{03}\ g_{02}\ g_{01}\ g_{00}$' can be generated based on the current folded context history 418C of F bit width as '$g_{09}\ g_{08}\ g_{07}\ g_{06}\ g_{05}\ g_{04}\ g_{03}\ g_{02}\ g_{01}\ g_{00}$' results, which is generally described in the folding operation by the folding circuit 420(2) in FIGS. 6 and 7 previously described.

This reduced logic level folding operation to create the new folded context history 418N based on the current folded context history 418C can be generally described as:

$$g[F-1:0]=n[N-1:0]\hat{\ }\{f[F-N-1:0],f[F-1:F-N]\}\hat{\ }\{b[B-1:B-N],R'b0\},$$

where:
'g' is the new folded context history of b;
'F' is also the length of g in bits;
'n' is the new set of bits to be added to b;
'N' is the length of n in bits;
'b' is the full FIFO bitstring in one generation;
'b' is the length of b in bits;
'f' is the current folded context history of b;
'F' is the length of f in bits; and
'R' is a fixed number=B % F.

Figure 10:
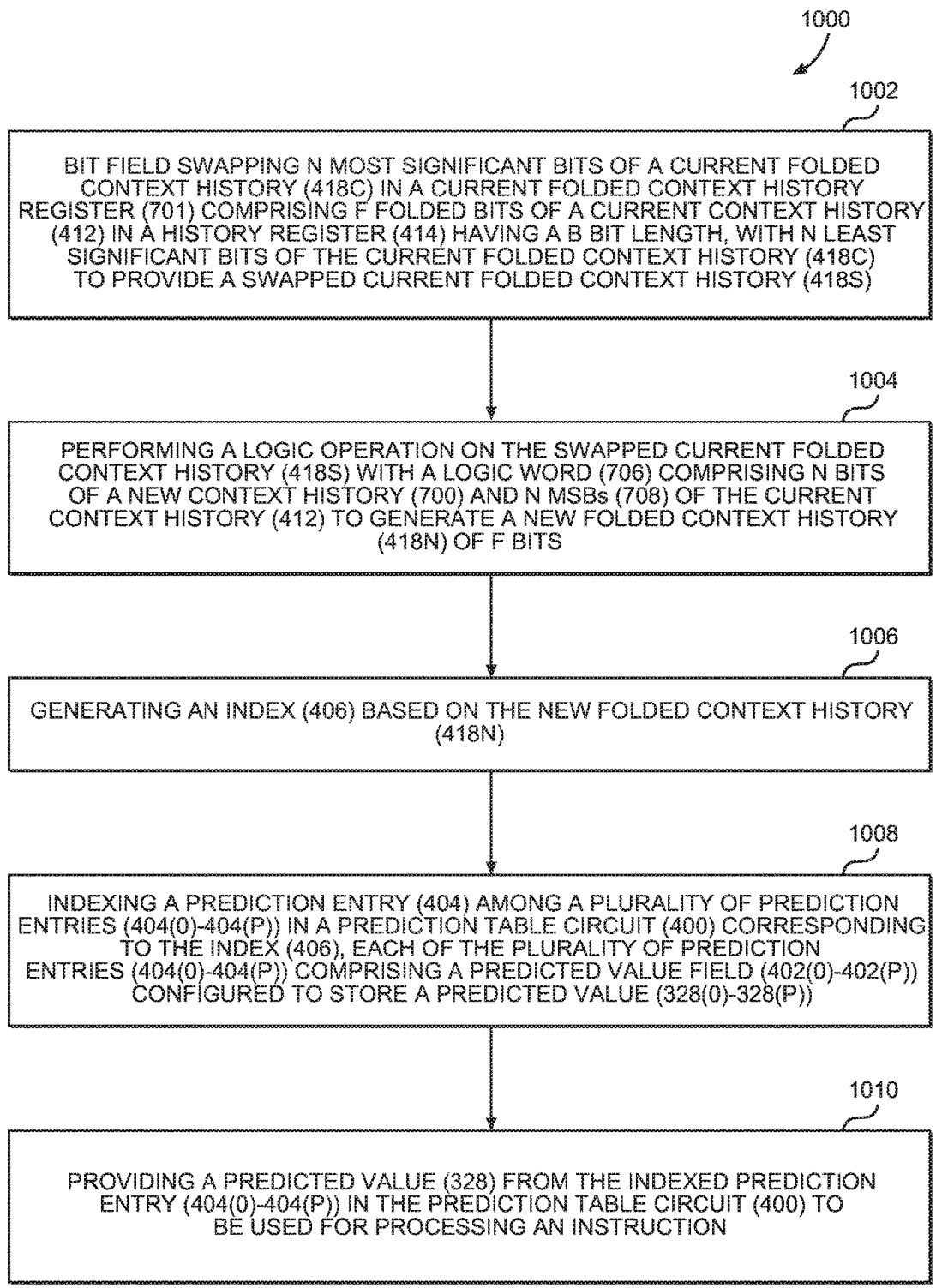
FIG. 10 is a flowchart illustrating an exemplary process of the reduced logic level folding operation illustrated in FIG. 7.

To generalize the reduced logic level folding operation performed in the folding circuit 420(2) in FIG. 7 and as also illustrated by example in FIG. 9B, FIG. 10 is provided. FIG. 10 is a flowchart illustrating an exemplary process 1000 of the reduced logic level folding operation that can be performed by the folding circuit 420(2) in the prediction circuit 326(1) in FIG. 4 as part of a prediction operation to generate the new folded context history 418N based on bit field swapping of the current folded context history 418C and performing a logic operation with a logic word 706 comprising the new context history 700 and the N MSBs 708 of the current context history 412. In this regard, the process 1000 involves bit field swapping N most significant bits of a current folded context history 418C in a current folded context history 701 comprising F folded bits of the current context history 412 in the history register 414 having a B bit length, with N least significant bits of the current folded context history 418C to provide a swapped current folded context history 418S (block 1002). A logic operation is then performed on the swapped current folded context history 418S with a logic word 706 comprising N bits of a new context history 700 and the N MSBs 708 of the current context history 412 to generate a new folded context history 418N of F bits (block 1004). The prediction circuit 326(1) can then use the new folded context history 418N to generate the index 406 based on the new folded context history 418N (block 1006). The prediction circuit 326(1) indexes a prediction entry 404 among the plurality of prediction entries 404(0)-404(P) in the prediction table circuit 400 corresponding to the index 406, each of the plurality of prediction entries 404(0)-404(P) comprising a predicted value field 402(0)-402(P) configured to store a predicted value 328(0)-328(P) (block 1008). The prediction circuit 326(1) then provides a predicted value 328 from the indexed prediction entry 404(0)-404(P) in the prediction table circuit 400 to be used for processing an instruction (block 1010).

Figure 11:
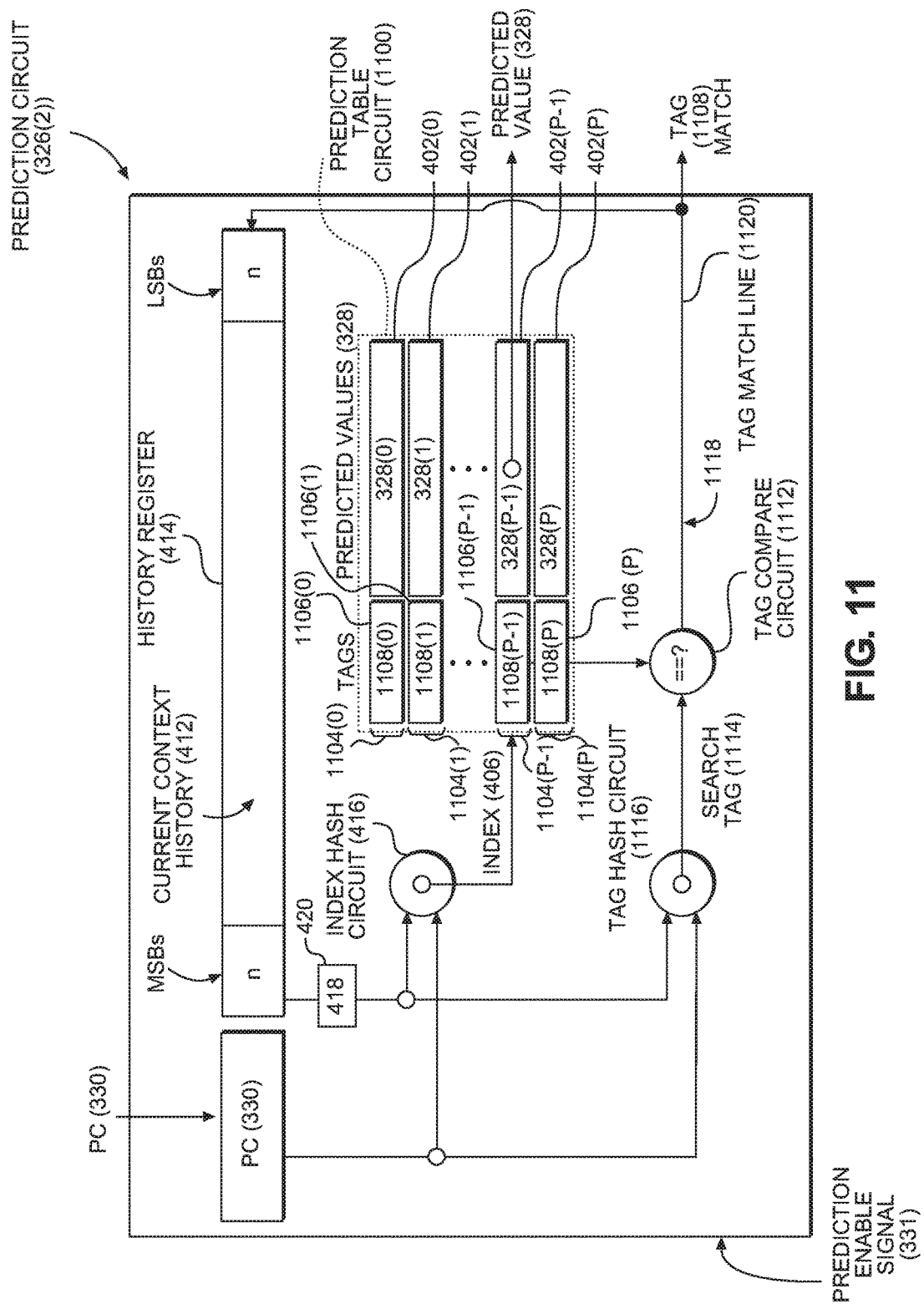
FIG. 11 is a schematic diagram of another exemplary prediction circuit that can be employed as the prediction circuit in the instruction processing system in FIG. 3.

FIG. 11 is a schematic diagram of another exemplary prediction circuit 326(2) that can be employed as the prediction circuit 326 in the instruction processing system 300 in FIG. 3 to perform a prediction operation for an instruction employing reduced logic level operation folding of a context history to be used as an index to obtain a predicted value for processing an instruction. Common element numbers between the prediction circuit 326(1) in FIG. 4 and the prediction circuit 326(2) in FIG. 11 are shown with common element numbers and will not be re-described. In the prediction circuit 326(2) in FIG. 11, a prediction table circuit 1100 is provided that is similar to the prediction table circuit 400 in the prediction circuit 326(1) in FIG. 4. However, prediction entries 1104(0)-1104(P) in the prediction table circuit 1100 in FIG. 11 additionally contain tag fields 1106(0)-1106(P) that are each configured to store a respective tag 1108(0)-1108(P). The prediction table circuit 1100 uses the generated index 406 by the index hash circuit 416 to select a prediction entry 1104(0)-1104(P). The tag 1108(0)-1108(P) stored in the selected prediction entry 1104(0)-1104(P) is read out. A tag compare circuit 1112 determines if the indexed tag 1108(0)-1108(P) matches a search tag 1114 generated by a tag hash circuit 1116. The tag hash circuit 1116 is configured to generate the search tag 1114 based on a hash operation between the PC 330 and the current folded context history 418 generated by the folding circuit 420 as previously discussed. If the indexed tag 1108(0)-1108(P) from the selected prediction entry 1104(0)-1104(P) in the prediction table circuit 1100 matches the search tag 1114, the tag compare circuit 1112 is configured to generate a tag match signal 1118 on a tag match line 1120 indicating a match between the search tag 1114 and the indexed tag 1108(0)-1108(P). The tag match signal 1118 indicating a tag 1108 match can be used by the instruction processing system 300 in FIG. 3 to verify that the predicted value 328 indexed by the index 406 is valid and can be used as a predicted value for an instruction 310 to be processed.

An instruction processing system that includes a prediction circuit or other circuitry that employs reduced logic level operation folding of a history register for use in indexing a prediction table circuit or other memory structure to obtain a predicted value for an instruction to be processed in a processor-based system according to aspects disclosed herein, may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 12:
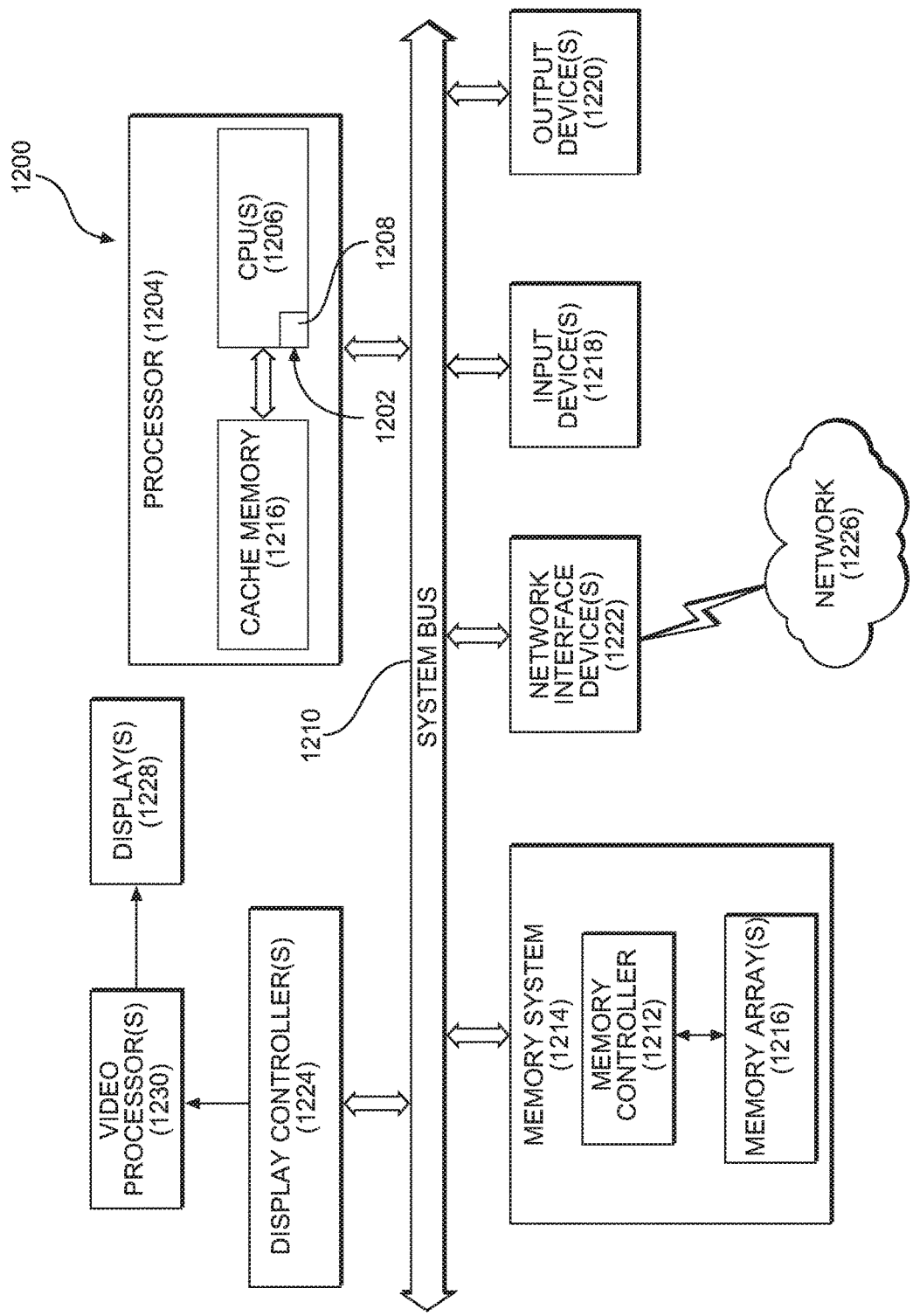
FIG. 12 is a block diagram of an exemplary processor-based system that can include an instruction processing system, such as the instruction processing system in FIG. 3, wherein the instruction processing system includes a prediction circuit configured to perform a prediction operation involving reduced logic level operation folding of a context history in a history register to be used to index a prediction table to obtain a predicted value for processing an instruction.

In this regard, FIG. 12 illustrates an example of a processor-based system 1200 that can include a prediction circuit 1202 or other circuitry that employs reduced logic level operation folding of a history register for use in indexing a prediction table circuit or other memory structure to obtain a predicted value for an instruction to be processed in the processor-based system 1200 according to aspects disclosed herein. For example, the prediction circuit 1202 may include the prediction circuits 326(1), 326(2) in FIGS. 4 and 11 previously described. In this example, the processor-based system 1200 includes a processor 1204 that includes one or more CPUs 1206. Each CPU 1206 includes an instruction processing system 1208, which for example, could be the instruction processing system 300 in FIG. 3. The instruction processing systems 1208 may include the prediction circuit 1202 that employs reduced logic level operation folding of a history register for use in indexing a prediction table circuit or other memory structure to obtain a predicted value for an instruction to be processed in the processor-based system 1200 according to aspects disclosed herein.

With continuing reference to FIG. 12, the CPUs 1206 can issue memory access requests over a system bus 1210. Memory access requests issued by the CPUs 1206 over the system bus 1210 can be routed to a memory controller 1212 in a memory system 1214 that includes one or more memory arrays 1216. Although not illustrated in FIG. 12, multiple system buses 1210 could be provided, wherein each system bus 1210 constitutes a different fabric. For example, the CPUs 1206 can communicate bus transaction requests to the memory system 1214 as an example of a slave device.

Other master and slave devices can be connected to the system bus 1210. As illustrated in FIG. 12, these devices can include the memory system 1214, one or more input devices 1218, one or more output devices 1220, one or more network interface devices 1222, and one or more display controllers 1224. The input device(s) 1218 can include any type of input device, including but not limited to input keys, switches, voice processors, etc. The output device(s) 1220 can include any type of output device, including but not limited to audio, video, other visual indicators, etc. The network interface device(s) 1222 can be any devices, including a modem, configured to allow exchange of data to and from a network 1226. The network 1226 can be any type of network, including but not limited to a wired or wireless network, a private or public network, a local area network (LAN), a wireless local area network (WLAN), a wide area network (WAN), a BLUETOOTH™ network, and the Internet. The network interface device(s) 1222 can be configured to support any type of communications protocol desired.

The CPUs 1206 can also be configured to access the display controller(s) 1224 over the system bus 1210 to control information sent to one or more displays 1228. The display controller(s) 1224 sends information to the display(s) 1228 to be displayed via one or more video processors 1230, which process the information to be displayed into a format suitable for the display(s) 1228. The display(s) 1228 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of folding a context history used to provide a predicted value for an instruction to be executed in an instruction processing system, comprising:
    bit field swapping N most significant bits (MSBs) of a current folded context history in a current folded context history register comprising F folded bits of a current context history in a history register having a B bit length, with N least significant bits (LSBs) of the current folded context history to provide a swapped current folded context history;
    performing a logic operation on the swapped current folded context history with a logic word comprising N bits of a new context history and N bits of the current context history to generate a new folded context history of F bits;
    generating an index based on the new folded context history;
    indexing a prediction entry among a plurality of prediction entries in a prediction table circuit corresponding to the index, each of the plurality of prediction entries comprising a predicted value field configured to store a predicted value; and
    providing the predicted value from the indexed prediction entry in the prediction table circuit to be used for processing the instruction.

2. The method of claim 1, comprising performing the logic operation as a single logic operation on the swapped current folded context history with the logic word comprising N LSBs of the new context history and N bits of the current context history to generate the new folded context history of F bits.

3. The method of claim 2, comprising performing the logic operation on the swapped current folded context history with the logic word comprising N LSBs of the new context history and N MSBs of the current context history starting at bit F−1 of the current context history to generate the new folded context history of F bits.

4. The method of claim 1, comprising performing the logic operation as a single logic level operation on the swapped current folded context history with the logic word comprising N bits of the new context history and N bits of the current context history to generate the new folded context history of F bits.

5. The method of claim 1, further comprising not performing successive logic operations on the current context history to generate the new folded context history.

6. The method of claim 1, comprising performing an exclusive OR (XOR)-based logic operation on the swapped current folded context history with a logic word comprising N LSBs of the new context history and N bits of the current context history to generate the new folded context history of F bits.

7. The method of claim 1, wherein the new folded context history comprises $$g[F-1:0]=n[N-1:0]\hat{}\{f[F-N-1:0],f[F-1:F-N]\}\hat{}\{b[B-1:B-N],R'b0\},$$

where:
    'b' is a First-In-First-Out (FIFO) bitstring;
    'B' is a length of b in bits;
    'n' is a new set of bits to be added to b;
    'N' is a length of n in bits;
    'f' is a current folded context history of b;
    'F' is a length of f in bits;
    'g' is a new folded context history of b;
    'F' is also a length of g in bits; and
    'R' is a fixed number=B % F.

8. The method of claim 1, further comprising hashing the new folded context history with a current program counter (PC) of the instruction into the index.

9. The method of claim 8, wherein:
    each of the plurality of prediction entries further comprise a tag field configured to store a tag;
    further comprising:
        hashing the new folded context history with the current PC of the instruction into a search tag; and
        determining if the search tag matches the tag in the prediction entry among the plurality of prediction entries corresponding to the index on the index input; and
    comprising:
        responsive to the search tag matching the tag in the prediction entry among the plurality of prediction entries corresponding to the index on the index input, providing the predicted value from the prediction entry among the plurality of prediction entries corresponding to the index on the index input.

10. The method of claim 1, wherein:
    each of the plurality of prediction entries further comprise a tag field configured to store a tag;
    further comprising:
        hashing the new folded context history with a current PC of the instruction into a search tag; and
        determining if the search tag matches the tag in the prediction entry among the plurality of prediction entries corresponding to the index on the index input; and
    comprising:
        responsive to the search tag matching the tag in the prediction entry among the plurality of prediction entries corresponding to the index on the index input, providing the predicted value from the prediction entry among the plurality of prediction entries corresponding to the index on the index input.

11. The method of claim 1, further comprising storing the new folded context history in the current folded context history register.

12. A non-transitory computer-readable medium having stored thereon computer executable instructions which, when executed by a processor, cause the processor to:
bit field swap N most significant bits (MSBs) of a current folded context history in a current folded context history register comprising F folded bits of a current context history in a history register having a B bit length, with N least significant bits (LSBs) of the current folded context history to provide a swapped current folded context history; and
perform a logic operation on the swapped current folded context history with a logic word comprising N bits of a new context history and N bits of the current context history to generate a new folded context history of F bits;
generate an index based on the new folded context history;
index a prediction entry among a plurality of prediction entries in a prediction table circuit corresponding to the index, each of the plurality of prediction entries comprising a predicted value field configured to store a predicted value; and
provide the predicted value from the indexed prediction entry in the prediction table circuit to be used for processing an instruction.

13. The non-transitory computer-readable medium of claim 12 having stored thereon computer executable instructions which, when executed by the processor, cause the processor to perform the logic operation as a single logic operation on the swapped current folded context history with the logic word comprising N bits of the new context history and N bits of the current context history to generate the new folded context history of F bits.

14. The non-transitory computer-readable medium of claim 12, having stored thereon computer executable instructions which, when executed by the processor, cause the processor to perform the logic operation as a single logic level operation on the swapped current folded context history with the logic word comprising N bits of the new context history and N bits of the current context history to generate the new folded context history of F bits.

15. The non-transitory computer-readable medium of claim 12, having stored thereon computer executable instructions which, when executed by the processor, further cause the processor to not perform successive logic operations of the current context history to generate the new folded context history.

16. The non-transitory computer-readable medium of claim 12, having stored thereon computer executable instructions which, when executed by the processor, further cause the processor to hash the new folded context history with a current program counter (PC) of the instruction into the index.

17. The non-transitory computer-readable medium of claim 12, having stored thereon computer executable instructions which, when executed by the processor, further cause the processor to:
hash the new folded context history with a current PC of the instruction into a search tag; and
determine if the search tag matches a tag in the prediction entry among the plurality of prediction entries corresponding to the index, each of the plurality of prediction entries further comprising a tag; and
cause the processor to:
responsive to the search tag matching the tag in the prediction entry among the plurality of prediction entries corresponding to the index on the index input, provide the predicted value from the prediction entry among the plurality of prediction entries corresponding to the index on the index input.

18. The non-transitory computer-readable medium of claim 12, having stored thereon computer executable instructions which, when executed by the processor, further cause the processor to store the new folded context history in the current folded context history register.

19. A prediction circuit, comprising:
a prediction table circuit comprising:
a plurality of prediction entries each comprising a predicted value field configured to store a predicted value;
an index input configured to receive an index; and
a predicted value output configured to provide a predicted value for an instruction to be processed;
the prediction table circuit configured to provide a predicted value from a prediction entry among the plurality of prediction entries corresponding to the index on the index input; and
a folding circuit configured to:
bit field swap N most significant bits (MSBs) of a current folded context history in a current folded context history register comprising F folded bits of a current context history in a history register having a B bit length, with N least significant bits (LSBs) of the current folded context history to provide a swapped current folded context history; and
perform a logic operation on the swapped current folded context history with a logic word comprising N bits of a new context history and N bits of the current context history to generate a new folded context history of F bits;
the prediction circuit configured to generate the index based on the new folded context history.

20. The prediction circuit of claim 19, wherein the folding circuit is configured to perform the logic operation as a single logic operation on the swapped current folded context history with the logic word comprising N bits of the new context history and N bits of the current context history to generate the new folded context history of F bits.

21. The prediction circuit of claim 19, wherein the folding circuit is configured to perform the logic operation as a single logic level operation of the swapped current folded context history with the logic word comprising N bits of the new context history and N bits of the current context history to generate the new folded context history of F bits.

22. The prediction circuit of claim 19, wherein the folding circuit is further configured to not perform successive logic operations on the current context history to generate the new folded context history.

23. The prediction circuit of claim 19, wherein the folding circuit is configured to perform the logic operation comprising an exclusive OR (XOR)-based logic operation on the swapped current folded context history with the logic word.

24. The prediction circuit of claim 19, wherein the folding circuit is configured to perform the logic operation on the swapped current folded context history with a logic word comprising N LSBs of the new context history and N MSBs of the current context history starting at bit F−1 of the current context history to generate the new folded context history of F bits.

25. The prediction circuit of claim 19, wherein the new folded context history comprises $$g[F-1:0] = n[N-1:0] \char`\^ \{f[F-N-1:0], f[F-1:F-N]\} \char`\^ \{b[B-1:B-N], R'b0\}$$

where:
- 'b' is a First-In-First-Out (FIFO) bitstring;
- 'B is a length of b in bits;
- 'n' is a new set of bits to be added to b;
- 'N' is a length of n in bits;
- 'f' is a current folded context history of b;
- 'F' is a length of f in bits;
- 'g' is a new folded context history of b;
- 'F' is also a length of g in bits; and
- 'R' is a fixed number=B % F.

26. The prediction circuit of claim 19, further comprising an index hash circuit configured to hash the new folded context history with a current program counter (PC) of the instruction into the index.

27. The prediction circuit of claim 26, wherein:
each of the plurality of prediction entries further comprise a tag field configured to store a tag;
the prediction table circuit configured to:
determine if a search tag matches the tag in the prediction entry among the plurality of prediction entries corresponding to the index on the index input; and
responsive to the search tag matching the tag in the prediction entry among the plurality of prediction entries corresponding to the index on the index input, provide the predicted value from the prediction entry among the plurality of prediction entries corresponding to the index on the index input; and
further comprising:
a tag hash circuit configured to hash the new folded context history with the current PC of the instruction into the search tag.

28. The prediction circuit of claim 19, wherein:
each of the plurality of prediction entries further comprise a tag field configured to store a tag;
the prediction table circuit configured to:
determine if a search tag matches the tag in the prediction entry among the plurality of prediction entries corresponding to the index on the index input; and
responsive to the search tag matching the tag in the prediction entry among the plurality of prediction entries corresponding to the index on the index input, provide the predicted value from the prediction entry among the plurality of prediction entries corresponding to the index on the index input; and
further comprising:
a tag hash circuit configured to hash the new folded context history with a current PC of the instruction into the search tag.

29. The prediction circuit of claim 19, wherein the folding circuit is further configured to store the new folded context history in the current folded context history register.

30. The prediction circuit of claim 19, further comprising a tag compare circuit configured to:
compare a tag in a prediction entry among the plurality of prediction entries corresponding to the index to a search tag; and
generate a tag match signal on a tag match line in response to the tag in the prediction entry among the plurality of prediction entries corresponding to the index matching the tag.

31. The prediction circuit of claim 19 integrated into a system-on-a-chip (SoC).

32. The prediction circuit of claim 19 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

33. An instruction processing system for a processor, comprising:
one or more instruction pipelines each comprising an instruction fetch circuit configured to fetch instructions from an instruction memory, and an execution circuit configured to execute the fetched instructions;
a history register configured to store a current context history having a B bit length associated with a program counter (PC) of a fetched instruction;
a current folded context history register configured to store a current folded context history comprising F folded bits of the current context history; and
a prediction circuit configured to:
bit field swap N MSBs of the current folded context history in the current folded context history register with N LSBs of the current folded context history in the current folded context history register to provide a swapped current folded context history in the current folded context history;
perform a logic operation on the swapped current folded context history with a logic word comprising N bits of a new context history and N bits of the current context history to generate a new folded context history of F bits;
generate an index based on the new folded context history; and
index a prediction table circuit comprising a plurality of prediction entries each comprising a predicted value field configured to store a predicted value with the generated index to obtain the predicted value for the fetched instruction.

34. The instruction processing system of claim 33, wherein the prediction circuit is further configured to store the new folded context history in the current folded context history register.

35. The instruction processing system of claim 33, configured to:
determine if the fetched instruction has an unproduced operand; and
generate a prediction enable signal in response to the fetched instruction containing the unproduced operand;
the prediction circuit configured to, in response to the prediction enable signal:
bit field swap N MSBs of the current folded context history in the current folded context history register with N LSBs of the current folded context history in the current folded context history register to provide the swapped current folded context history in the current folded context history;

perform the logic operation on the swapped current folded context history with the logic word comprising N bits of the new context history and N bits of the current context history to generate the new folded context history of F bits;

generate the index based on the new folded context history; and index the prediction table circuit to obtain the predicted value for the fetched instruction.

36. The instruction processing system of claim 33, configured to shift in N bits based on the PC of the fetched instruction into the current folded context history in the current folded context history register.

37. The instruction processing system of claim 33, configured to:

hash the PC of the fetched instruction down to N hashed bits; and shift in the N hashed bits into the current folded context history in the current folded context history register.

38. The instruction processing system of claim 33, wherein:

the one or more instruction pipelines comprise:
  a front end instruction stage comprising the instruction fetch circuit and the prediction circuit; and
  a back end instruction stage comprising an execution circuit configured to execute the fetched instructions;
the prediction circuit configured to provide the predicted value for the fetched instruction among the fetched instructions to the back end instruction stage to be used to execute the fetched instruction.

39. The instruction processing system of claim 33, wherein the prediction circuit is configured to perform the logic operation as a single logic operation on the swapped current folded context history with the logic word comprising N bits of the new context history and N bits of the current context history to generate the new folded context history of F bits.

40. The instruction processing system of claim 33, wherein the prediction circuit is configured to perform the logic operation as a single logic level operation on the current folded context history with the logic word comprising N bits of the new context history and N bits of the current context history to generate the new folded context history of F bits.

41. The instruction processing system of claim 33, wherein the prediction circuit is further configured to not perform successive logic operations on the current context history to generate the new folded context history.

42. The instruction processing system of claim 33, wherein the prediction circuit is configured to perform the logic operation comprising an exclusive OR (XOR)-based logic operation on the swapped current folded context history with the logic word.

43. The instruction processing system of claim 33, wherein the prediction circuit is configured to perform the logic operation on the swapped current folded context history with a logic word comprising N LSBs of the new context history and N MSBs of the current context history starting at bit F−1 of the current context history to generate the new folded context history of F bits.

44. The instruction processing system of claim 33, wherein the prediction circuit further comprises an index hash circuit configured to hash the new folded context history with a current program counter (PC) of the fetched instruction into the index.

45. The instruction processing system of claim 33, wherein:

each of the plurality of prediction entries further comprise a tag field configured to store a tag;
the prediction table circuit is configured to:
  determine if a search tag matches the tag in the prediction entry among the plurality of prediction entries corresponding to the index; and
  responsive to the search tag matching the tag in the prediction entry among the plurality of prediction entries corresponding to the index on the index input, provide the predicted value from the prediction entry among the plurality of prediction entries corresponding to the index on the index input; and
further comprising:
  a tag hash circuit configured to hash the new folded context history with a current PC of the fetched instruction into the search tag.

* * * * *